US012187647B2

(12) United States Patent
Benck et al.

(10) Patent No.: US 12,187,647 B2
(45) Date of Patent: Jan. 7, 2025

(54) ELECTROCHEMICAL MATERIALS PRODUCTION AND PROCESSING

(71) Applicant: Sublime Systems, Inc., Somerville, MA (US)

(72) Inventors: Jesse D. Benck, Wakefield, MA (US); Yet-Ming Chiang, Weston, MA (US); Leah D. Ellis, Somerville, MA (US); Kyle Dominguez, Somerville, MA (US); Mariya Layurova, Somerville, MA (US)

(73) Assignee: Sublime Systems, Inc., Somerville, MA (US)

( * ) Notice: Subject to any disclaimer, the term of this patent is extended or adjusted under 35 U.S.C. 154(b) by 0 days.

(21) Appl. No.: 18/554,369

(22) PCT Filed: Apr. 5, 2022

(86) PCT No.: PCT/US2022/023534
§ 371 (c)(1),
(2) Date: Oct. 6, 2023

(87) PCT Pub. No.: WO2022/216741
PCT Pub. Date: Oct. 13, 2022

(65) Prior Publication Data
US 2024/0166566 A1 May 23, 2024

Related U.S. Application Data

(60) Provisional application No. 63/320,527, filed on Mar. 16, 2022, provisional application No. 63/271,797, filed on Oct. 26, 2021, provisional application No. 63/252,455, filed on Oct. 5, 2021, provisional application No. 63/181,053, filed on Apr. 28, 2021, provisional application No. 63/171,180, filed on Apr. 6, 2021.

(51) Int. Cl.

| | |
|---|---|
| *C04B 28/18* | (2006.01) |
| *C04B 40/00* | (2006.01) |
| *C25B 1/04* | (2021.01) |
| *C25B 1/20* | (2006.01) |
| *C25B 1/34* | (2006.01) |
| *C25B 15/08* | (2006.01) |
| *C25C 1/00* | (2006.01) |
| *C22B 7/00* | (2006.01) |

(52) U.S. Cl.
CPC .......... *C04B 28/18* (2013.01); *C04B 40/0007* (2013.01); *C25B 1/04* (2013.01); *C25B 1/20* (2013.01); *C25B 1/34* (2013.01); *C25B 15/081* (2021.01); *C25C 1/00* (2013.01); *C22B 7/007* (2013.01)

(58) Field of Classification Search
CPC ....... C04B 28/18; C04B 40/0007; C04B 7/02; C04B 7/36; C04B 7/364; C04B 7/367; C04B 7/42; C04B 7/424; C25B 1/20; C25B 1/34; C25B 15/081; C25B 1/22; C25B 15/08; C25B 1/04; C25B 1/50; C25B 1/46; C25C 1/00; C25C 7/06; C25C 1/06; C25C 1/08; C25C 1/10; C25C 1/12; C25C 1/16; C22B 7/00; C22B 7/007; C22B 7/02; C02F 1/469
See application file for complete search history.

(56) References Cited

U.S. PATENT DOCUMENTS

| | | | |
|---|---|---|---|
| 2005/0002847 A1* | 1/2005 | Maroto-Valer | ......... C01B 32/60 423/432 |
| 2007/0217981 A1 | 9/2007 | Van Essendelft | |
| 2011/0091366 A1* | 4/2011 | Kendall | ................. C04B 14/04 423/220 |
| 2011/0135551 A1 | 6/2011 | House et al. | |
| 2012/0183462 A1* | 7/2012 | Rau | ........................ B01D 53/62 423/220 |
| 2015/0183653 A1* | 7/2015 | Jung | ....................... C25B 15/08 204/263 |

FOREIGN PATENT DOCUMENTS

| | | |
|---|---|---|
| JP | 2000-281398 A | 10/2000 |
| WO | 2008/124538 A1 | 10/2008 |

OTHER PUBLICATIONS

Mineral Data. Wollastonite [retrieved from the internet on Apr. 15, 2024 <URL:https://www.webmineral.com/data/Wollastonite-1A.shtml> and wayback <URL:https://web.archive.org/web/20200209033914/https://www.webmineral.com/data/Wollastonite-1A.shtml#.Xj9-5HbP1qY>] (Year: 2020).*
Solubility and pH [retrieved on Apr. 15, 2024 <URL:https://chem.libretexts.org/Courses/University_of_California_Davis/UCD_Chem_002B/UCD_Chem_2B/Text/Unit_III%3A_Chemical_Equilibria/17%3A_Solubility_and_Complex-Ion_Equilibria/17.7%3A_Solubility_and_pH>] (Year: 2016).*
Carbon Dating the Web of Solubilty and pH <URL:https://carbondate.cs.odu.edu/#https://chem.libretexts.org/Courses/University_of_California_Davis/UCD_Chem_002B/UCD_Chem_2B/Text/Unit_III%3A_Chemical_Equilibria/17%3A_Solubility_and_Complex-Ion_Equilibria/17.7%3A_Solubility_and_pH> (Year: 2016).*
Jove. Common Ion Effect [retrieved on Apr. 16, 2024 from <URL:https://www.jove.com/science-education/11408/common-ion-effect-and-dissociationionization-equilibria>] (Year: 2020).*
Web source date upload of Jove—Common Ion Effect (Year: 2020).*

(Continued)

*Primary Examiner* — Anthony J Green
*Assistant Examiner* — Marites A Guino-O Uzzle
(74) *Attorney, Agent, or Firm* — Morrison & Foerster LLP

(57) ABSTRACT

Various embodiments include a system or platform that uses electrochemistry to upcycle waste products and low-value minerals into valuable, carbon dioxide ($CO_2$)-neutral materials. Various embodiments may include systems and/or methods for processing material inputs using an electrochemical reactor. Various embodiments may include systems, methods, and/or devices for capturing and sequestering carbon dioxide ($CO_2$) while producing valuable co-products.

19 Claims, 9 Drawing Sheets

(56) References Cited

OTHER PUBLICATIONS

Xiaohong Xie, Miao Song, Luguang Wang, Mark H. Engelhard, Langli Luo, Andrew Miller, Yayun Zhang, Lei Du, Huilin Pan, Zimin Nie, Yuanyuan Chu, Luis Estevez, Zidong Wei, Hong Liu, Chongmin Wang, Dongsheng Li, and Yuyan Shao ACS Catalysis 2019 9 (9), 8712-8718 DOI: 10.1021/acscatal.9b02609 (Year: 2019).*

International Search Report and Written Opinion dated Jul. 18, 2022, directed to International Application No. PCT/US2022/023534; 11 pages.

International Preliminary Report on Patentability dated Oct. 10, 2023, directed to International Application No. PCT/2022/023534; 8 pages.

Suraneni et al. (2019). "New insights from reactivity testing of supplementary cementitious materials," Cement and Concrete Composites 103: 331-338.

* cited by examiner

ELECTROCHEMICAL MATERIALS PRODUCTION AND PROCESSING

CROSS-REFERENCE TO RELATED APPLICATIONS

This application is a national stage application under 35 USC 371 of International Application No. PCT/US2022/023534, filed Apr. 5, 2022, which claims the benefit of priority to U.S. Provisional Application No. 63/171,180, filed Apr. 6, 2021, U.S. Provisional Application No. 63/181,053, filed Apr. 28, 2021, U.S. Provisional Application No. 63/252,455, filed Oct. 5, 2021, U.S. Provisional Application No. 63/271,797, filed Oct. 26, 2021, and U.S. Provisional Application No. 63/320,527, filed Mar. 16, 2022, the entire contents of each priority application is incorporated herein by reference for all purposes.

BACKGROUND

Earth's growing population uses more raw materials and produces more waste than ever before. These trends are causing two coupled problems: (1) the enormous $CO_2$ emissions caused by material manufacturing; and (2) the environmental damage caused by storage of industrial waste materials.

Most industrial-scale material production processes can require huge energy inputs from fossil fuels. Metal and cement production processes can cause particularly large greenhouse gas (GHG) emissions, such as $CO_2$ emissions. For example, it has been estimated that current metal production methods account for 10% of global $CO_2$ emissions and current cement production methods account for 8% of global $CO_2$ emissions. Current metal and cement production methods can also cause negative environmental impacts including acid mine drainage, environmental contamination with toxic compounds, and sulfur oxides ($SO_x$) emissions to the atmosphere.

Storage and disposal of industrial waste products can also damage the environment. Coal ash, a byproduct of electricity production at coal-fired power plants, is a good example. This ash is an aluminosilicate containing many trace metal impurities. Fly ash, the lighter and finer fraction, can be used as a supplementary cementitious material (SCM) to reduce the amount of cement needed in concrete. However, bottom ash, which is coarser and less reactive, has few engineering applications, and therefore is typically disposed of as a waste product in landfills or ponds. Metal impurities can leach out of bottom ash storage ponds and cause groundwater and aquatic ecosystem contamination.

Deep decarbonization of the worldwide energy system will require addressing not only well-recognized sources of greenhouse gas emission such as energy generation and transportation, but also difficult-to-decarbonize sectors such as large industry.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Various embodiments may provide a system or platform that uses electrochemistry to upcycle waste products and low-value minerals into valuable, carbon dioxide ($CO_2$)-neutral materials. Various embodiments may include an impurity-tolerant electrochemical reactor, powered by renewable electricity, that generates strong acids and bases useful in materials processing. In various embodiments, magnesium, silica, and valuable metals may be recovered from waste products and/or highly abundant, but low-value, mafic and/or ultramafic rocks.

Various embodiments may include systems and/or methods for processing material inputs using an electrochemical reactor. In various embodiments, the material inputs may include a variety of natural and/or man-made substances. In various embodiments, the electrochemical reactor may be powered by the input of electricity and produces chemicals such as acids and bases, and/or the precursors thereof. The acids and bases may be used to react with the input materials, and through these reactions, the input materials may be purified, separated, activated, and/or otherwise modified into useful forms. In some embodiments, the output materials may be used directly, and/or the output materials may be further refined, reacted, or processed.

Various embodiments may include systems, methods, and/or devices for capturing and sequestering carbon dioxide ($CO_2$) while producing valuable co-products. In various embodiments, carbon dioxide may be mineralized while simultaneously a silicate is at least partially dissolved and subsequently precipitated in order to perform an operation, including to produce a product. In various embodiments, a process or method is conducted whereby a reactant comprising sodium hydroxide is reacted with a silicate, forming a mixture in which said silicate is at least partially dissolved. In various embodiments, simultaneously or subsequently, carbon dioxide may be reacted with said mixture, causing precipitation of a silicate (including but not limited to silica, $SiO_2$). In some embodiments, the starting siliceous solid and/or precipitated siliceous product may be aluminum silicates, iron silicates, or calcium silicates. In various embodiments, simultaneously or subsequently, carbon dioxide may be captured and sequestered by the formation of solid or dissolved sodium carbonate.

Various embodiments may include a method comprising: providing a source of electricity; selecting an input material to be processed; using the source of electricity to power an electrochemical reactor that converts a salt solution into at least one acid solution and/or at least one base solution; using the acid solution and/or base solution to process the input material; and producing one or more products.

Various embodiments may include a system, comprising: a source of electricity; an electrochemical reactor powered by the source of electricity that converts a salt solution into at least one acid solution and/or at least one base solution; chemical, mechanical, electrical, and/or electrochemical process equipment for handling and/or introducing one or more input materials into the system; chemical, mechanical, electrical, and/or electrochemical process equipment used to react the input material(s) with at least one of solutions produced by the electrochemical reactor; chemical, mechanical, electrical, and/or electrochemical process equipment for collecting and/or outputting one or more products from the system.

Various embodiments may include a method, comprising: selecting an input material to be processed; processing the input material; and producing one or more products. In some embodiments, processing the input material may comprise using at least one acid solution and/or at least one base solution to process the input material. In some embodiments, the acid solution and/or the base solution are electrochemically produced. In some embodiments, the acid solution and/or the base solution are not electrochemically produced.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

Figure 1:
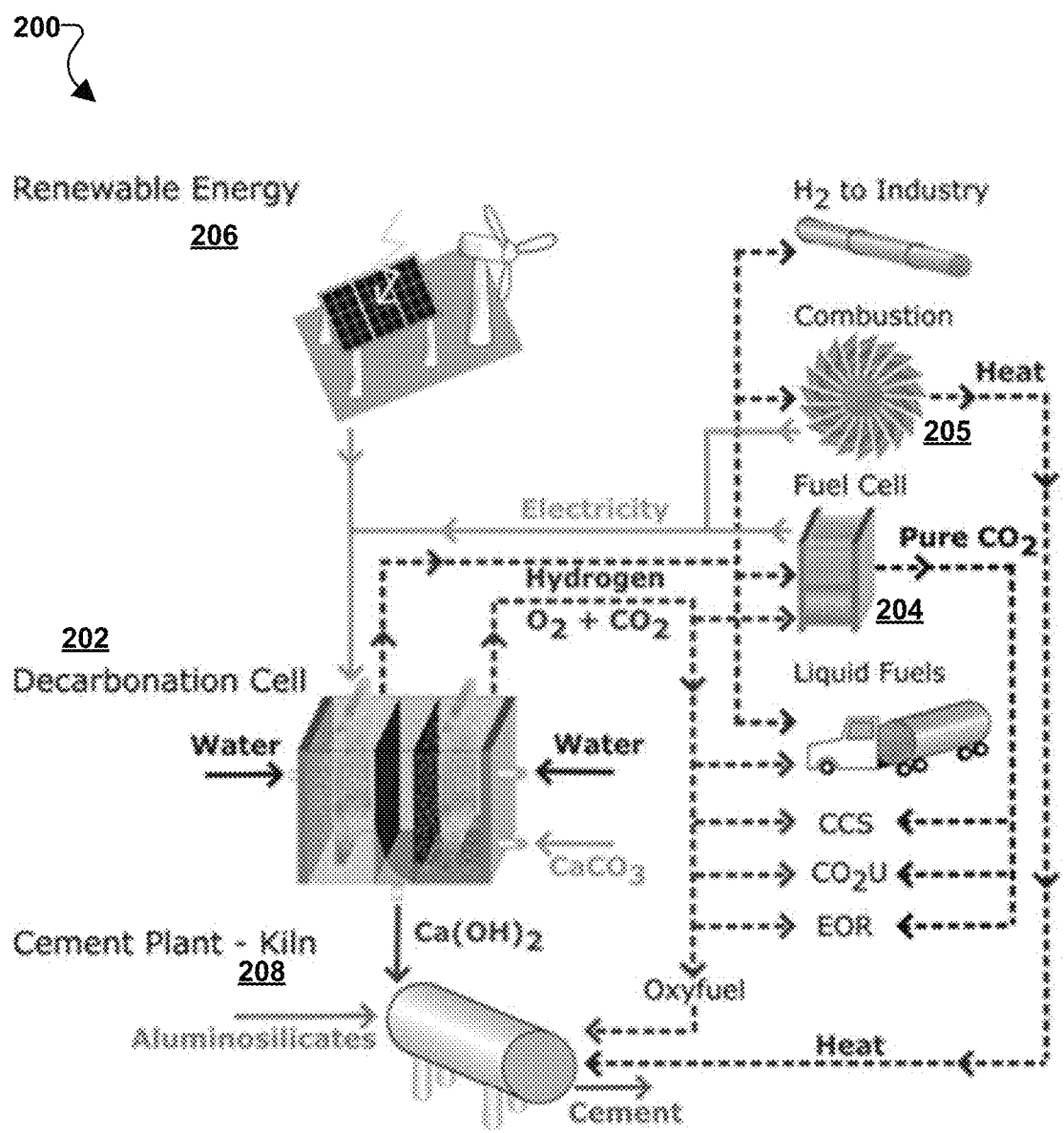
FIG. 1 illustrates a specific example system in accordance with various embodiments.

The accompanying drawings, which are incorporated herein and constitute part of this specification, illustrate example embodiments of the claims, and together with the general description given above and the detailed description given below, serve to explain the features of the claims.

DETAILED DESCRIPTION

References made to particular examples and implementations are for illustrative purposes and are not intended to limit the scope of the claims. The following description of the embodiments of the invention is not intended to limit the invention to these embodiments but rather to enable a person skilled in the art to make and use this invention.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories may not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

As used herein, "precipitated" may mean formed in a precipitation reaction.

As used herein, "precipitation reaction" may mean a chemical reaction wherein two solutions containing dissolved ionic species are combined and the ions react to form a solid.

As used herein, "lime" may be a material comprising quicklime (calcium oxide, CaO), hydrated lime (calcium hydroxide, $Ca(OH)_2$), or a mixture of the two.

As used herein, "pozzolan" may be a silicate or aluminosilicate mineral, either naturally occurring or synthesized (man-made). It may be any silicate-bearing material that is capable of reacting with lime to set and harden, with or without the presence of water, to form a cement or concrete.

As used herein, "water demand" may mean the amount of water that must be added to a particulate solid to produce a paste with the same consistency as a portland cement paste made with 0.4 parts water per 1.0 parts cement by mass.

As used herein, "paste consistency water demand" may refer to the water demand as determined by comparing the consistency of a paste made from a particulate solid sample mixed distilled water to the consistency of a reference paste. The reference paste is prepared by mixing 100 grams (g) of portland cement with 40 g of water (water/binder mass ratio of 0.40). The paste is mixed well by hand using a spatula for at least one minute. The sample paste is prepared by mixing 100 g of the particulate solid sample material with a known quantity of distilled water. The quantity of water added may be adjusted based on the desired water/binder mass ratio (for example, for a water/binder mass ratio of 0.30, 30 g of water would be added to 100 g of the particulate solid). The paste is mixed well by hand using a spatula for at least one minute, at which point the consistency of the sample paste is compared with the consistency of the reference paste. If the consistency of the sample paste is thicker than the consistency of the reference paste, an additional 5 g water may be added to the sample paste and mixed again for one minute. This process may be repeated until the sample paste has the same consistency as the reference solution paste. The final water demand of the sample is determined by dividing the total amount of water added to the paste by the starting amount of the dry particulate solid sample material. This entire process must be completed within 10 minutes (min) to ensure the reference paste viscosity does not change significantly during the measurement.

As used herein, "mini-slump cone water demand" may refer to the water demand as measured by paste spread from a mini-slump cone. A mini-slump cone with 19 millimeters (mm) top diameter, 38 mm bottom diameter, and 57 mm height is placed on a flat paper marked with a set of concentric circles with different diameters from 30 mm to 200 mm. 100 g of the particulate solid to be measured is combined with a known quantity of distilled water. The quantity of water added may be adjusted based on the desired water/binder mass ratio (for example, for a water/binder mass ratio of 0.40, 40 g of water would be added to 100 g of the particulate solid). The particulate solid and water are mixed using a shear mixer for 30 s, then mixed with a spatula for 15 seconds (s), and finally mixed again for another 30 s with the shear mixer. The homogeneously mixed paste is immediately poured into the mini slump-cone, and then the cone is lifted slowly. After 30 s, a digital photograph is taken directly above the spread paste. This photograph is then digitally analyzed to determine the spread area and calculate the equivalent diameter of the spread. Each paste is tested in triplicate, using three separately mixed batches of paste. The water demand is defined as the amount of water that must be added to a particulate solid to produce a suspension with the same spread flow diameter as a portland cement paste made with 0.4 parts water per 1.0 parts cement by mass.

As used herein, "aspect ratio" may mean the ratio of a particle's major diameter to its minor diameter.

As used herein, various molecular formulas are used in relation to mass compositions, especially in relation to "mass percentages". In the mass compositions, the molecular formulas are used as the mass basis for the material composition, but should not be read as to imply that the material is composed of these precise chemical species. For example, an olivine with the formula $MgFeSiO_4$ may contain approximately 34.9% $SiO_2$ on a mass basis and would be considered to have a greater than about 30% $SiO_2$ as a mass percentage.

Various embodiment methods, systems, materials, and/or devices may solve one or more environmental problems, such as the enormous carbon dioxide ($CO_2$) emissions caused by material manufacturing, the environmental damage caused by storage of industrial waste materials, etc. Various embodiments may support the goal of electrifying industrial production of chemicals and materials.

Various embodiments may provide a platform technology that uses electrochemistry to upcycle waste products and low-value minerals into valuable, $CO_2$-neutral materials. Various embodiments may include an impurity-tolerant electrochemical reactor, powered by renewable electricity, that generates strong acids and bases useful in materials processing. In various embodiments, magnesium, silica, and valuable metals may be recovered from waste products (e.g., coal bottom ash) and highly abundant but low-value mafic or ultramafic rocks (e.g., olivines), which contain Mg, Ca, Si, Fe, Ni, Co, Cr, Cu, Zn, etc. in varying concentrations. For example, bottom ash contains elements that may be extracted and converted into value-added products, but this resource is currently not utilized. Similarly, mafic and/or ultramafic rocks, such as olivine, also represent an under-utilized resource. While these materials are naturally occurring and do not cause environmental degradation, these materials currently have few applications despite their great abundance, which presents an opportunity. Various embodiments may leverage electrochemical process for lime production and capabilities for mining municipal incinerator ash to recover and separate target elements from waste and minerals at low temperature using renewable electricity.

Various embodiments may include systems for processing material inputs using an electrochemical reactor. The material inputs may include a variety of natural and/or man-made substances such as mafic and/or ultramafic minerals, olivine, limestone, dolomite, fly ash, coal bottom ash, or other materials. The electrochemical reactor may be powered by the input of electricity and produces chemicals, such as acids and bases, or the precursors thereof. The acids and bases may be used to react with the input materials, and through these reactions, the input materials may be purified, separated, activated, and/or otherwise modified into useful forms. In some embodiments, the acid produced by the electrolyzer is used to leach certain elements out of the input materials, and these elements are collected as pure metals by electrowinning or reacted with the base solution produced by the electrochemical reactor to precipitate metal salts, including metal hydroxides. In some embodiments, the output materials may be used directly, and in some embodiments the output materials may be further refined, reacted, or processed. In some embodiments, the outputs may include silicates useful as a supplementary cementitious material or a component of pozzolanic cement, calcium hydroxide useful as a component of pozzolanic cement, magnesium chloride or magnesium hydroxide useful as a feedstock for magnesium metal production, and/or iron, zinc, copper, or other metals. In some embodiments, the outputs are used to sequester carbon dioxide by forming metal carbonates, such as $Na_2CO_3$ or $MgCO_3$. Various embodiments systems may enable the manufacturing of multiple useful materials with low, zero, or negative carbon dioxide emissions. In some embodiments, the chemicals, such as acids and/or bases, used in processing material inputs may not be produced by electrochemical reactors. In some embodiments, the processing of material inputs may occur without the use of acids and/or bases.

Methods for mineralization of carbon dioxide ($CO_2$), for example through the formation of solid metal carbonates such as $Na_2CO_3$, $MgCO_3$, or $CaCO_3$, may typically include reacting $CO_2$ with a solid or dissolved source of the cation, such as a solid or dissolved metal hydroxide, in order to precipitate the solid metal carbonate. A drawback of such approaches is that the economic value derived therefrom resides primarily with the metal carbonate, which may have some market value (for example, $Na_2CO_3$ is the main constituent of baking soda), but if the mineralized carbonate is produced at the gigaton scale, as is necessary for substantial decarbonization through $CO_2$ capture and sequestration, much of this reaction product must simply be disposed of and has little or even negative value (that is, there may be an incurred cost for disposal).

In various embodiments, carbon dioxide may be mineralized while simultaneously a silicate is at least partially dissolved and subsequently precipitated in order to perform an operation, including to produce a product. In various embodiments, a process or method may be conducted whereby a reactant comprising sodium hydroxide is reacted with a silicate, forming a mixture in which said silicate is at least partially dissolved. In various embodiments, simultaneously or subsequently, carbon dioxide may be reacted with said mixture, causing precipitation of a silicate (including but not limited to silica, $SiO_2$). In some embodiments, the starting siliceous solid and/or precipitated siliceous product may be aluminum silicates, iron silicates, or calcium silicates. In various embodiments, simultaneously or subsequently, carbon dioxide may be captured and sequestered by the formation of solid or dissolved sodium carbonate.

Metals and cement may be produced using a wide range of conventional processes, but nearly all entail mining materials from the Earth's crust, then reacting or purifying these materials using energy-intensive thermal, chemical, and/or electrical methods. Since these conventional processes are all energy intensive and largely powered by fossil fuels, these conventional processes result in enormous $CO_2$ emissions.

Focusing on Mg production as a representative example of metal production processes. The most common Mg production technique is the Pidgeon Process. This process emits huge amounts of $CO_2$ due to both "process" emissions from fossil fuel combustion and "chemical" emissions from the decomposition of the input materials. The feedstock, typically either magnesite or dolomite ($MgCO_3$ or $(Mg,Ca)CO_3$), is calcined to produce MgO, resulting in chemical $CO_2$ emissions. The MgO is then reacted with Si at high temperature (>1100° C.) and low pressure (<100 Pa), forming $SiO_2$ and vapor-phase Mg, which can be condensed as relatively pure Mg metal. These steps are usually powered by coal combustion, which causes process $CO_2$ emissions. In total, Mg production can produce as much as 42 kg $CO_2$-eq/kg Mg.

Both the process and chemical emissions could be reduced by producing MgO from $Mg(OH)_2$, which does not contain chemically bound $CO_2$ and has a lower calcining temperature of ~400° C. However, the only relevant source of $Mg(OH)_2$ is extraction from massive amounts of seawater, which emits an estimated 1.6-3.3 kg $CO_2$-eq/kg $Mg(OH)_2$ (6.7-14 kg $CO_2$-eq/kg Mg). Several alternative Mg production processes exist, including electrolytic processes such as the Dow process. Unfortunately, these also have very high energy requirements, and frequently produce chemical $CO_2$ emissions from magnesite or dolomite decomposition, resulting in total GHG production of up to 18 kg $CO_2$-eq/kg Mg.

Portland cement is currently produced by heating limestone, clay, and sand to >1400° C. in a kiln powered by coal or other fossil fuels. As in Mg production, this results in both process emissions from fossil fuel combustion and chemical emissions from the decomposition of $CaCO_3$, the primary component of limestone. In total, cement production results in average emissions of 0.93 kg $CO_2$/kg cement. While much smaller than the emissions caused by Mg production on a mass basis, due to the enormous quantity of cement produced every year, the total annual emissions are huge, with cement production accounting for 8% of the global $CO_2$ emissions.

Decreasing the amount of cement used in concrete has been the most productive strategy to curb these emissions to date. In a typical concrete mix, around 20-30% of portland cement can be replaced with SCMs or pozzolans. Herein, the terms SCM and pozzolan are used interchangeably to refer to disordered aluminosilicate materials. Presently, the most widely used SCMs are coal fly ash and blast furnace slag, but the available supply of these materials is almost entirely consumed and declining over time. Calcined clays are more abundant alternative SCMs, but their production requires calcination at 700° C., so these materials still cause $CO_2$ emissions of 0.20-0.39 kg $CO_2$-eq/kg depending on the production technology employed.

Alternative low-carbon cement production processes are needed. One promising approach is an electrochemical process to produce decarbonized $Ca(OH)_2$, which can be blended with pozzolans and other additives to create a form-fit-function replacement for portland cement. This approach has the potential to eliminate both process and chemical emissions to fully decarbonize cement, but this approach relies on a large supply of abundant, $CO_2$-neutral pozzolans. Additionally, a process for upcycling or otherwise processing bottom ash or olivine is needed.

Various embodiments include a flexible platform for upcycling waste products and low-value minerals into valuable, $CO_2$-neutral materials using aqueous electrochemistry. Various embodiments enable industrial electrification of recycling and material manufacturing processes, while making a global impact by significantly reducing $CO_2$ emissions and landfilled waste. Various embodiments provide a generalized platform for a variety of material manufacturing processes.

In some embodiments, the input materials for this process may be olivines from natural sources and/or ponded coal ash. Various embodiments may enable recovering $Mg(OH)_2$, aluminosilicates, and metals from these inputs, which may contain Mg, Ca, Si, Fe, Ni, Co, Cr, Cu, Zn, etc. in varying concentrations. These outputs are valuable products that can be used in many applications as decarbonated alternatives to conventional materials. $Mg(OH)_2$ may be used as a decarbonated feedstock for Mg metal production or for $CO_2$ sequestration via mineralization. The aluminosilicate fraction may be used as a pozzolanic input in decarbonized cements, while valuable transition metals, such as Fe, Ni, Co, and Cr, may be extracted for use in lithium-ion battery technology and high-performance metallurgical alloys.

Various embodiments may include an impurity-tolerant electrochemical reactor, powered by renewable electricity, that generates strong acids and bases useful in materials processing. Various embodiments may include an improved electrolyzer with two critical advantages: (1) increased impurity tolerance to enable processing complex, contaminated materials with minimal purification; and (2) improved ramp ability and resistance to damage under intermittent renewable electricity inputs.

Figure 2:
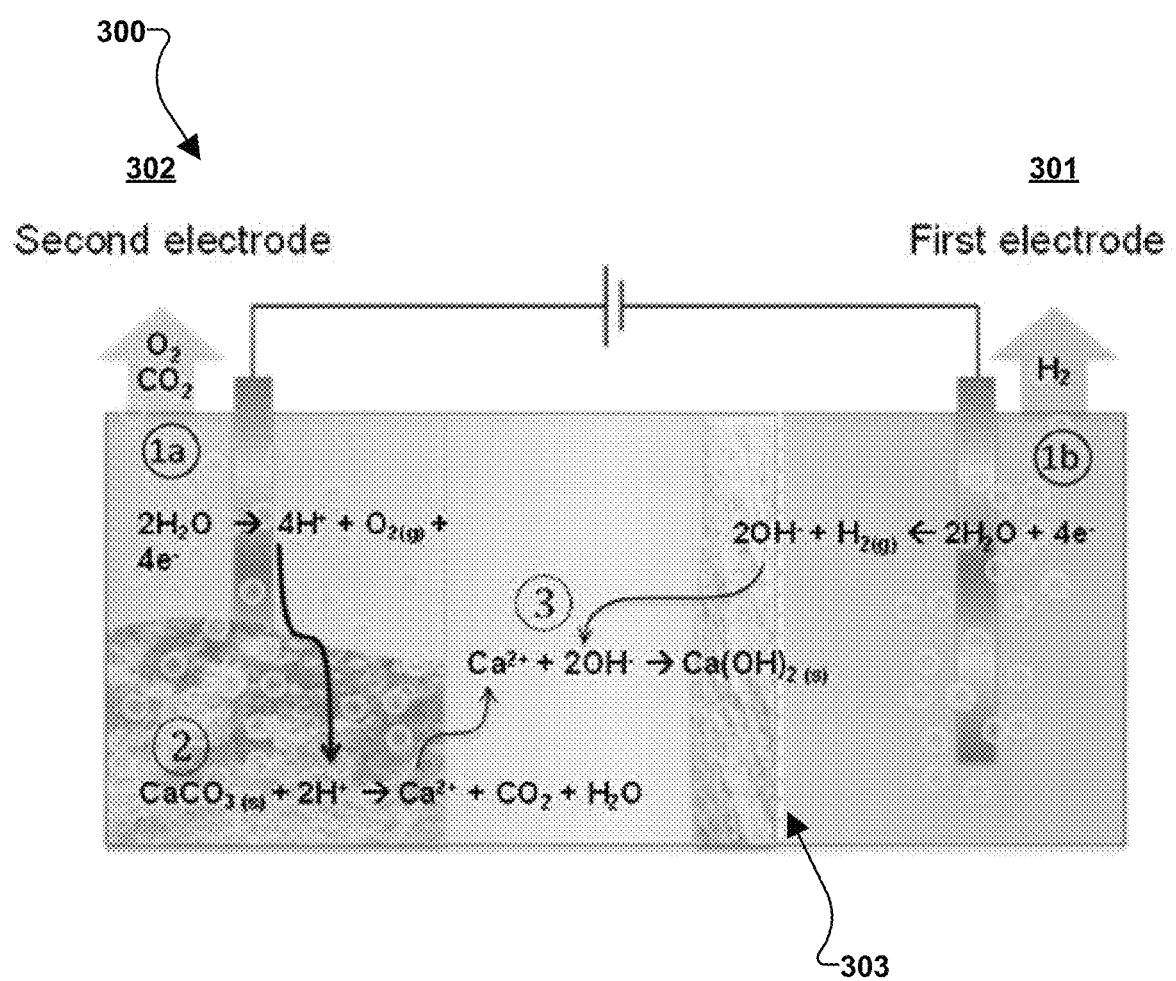
FIG. 2 illustrates a specific example reactor in accordance with various embodiments comprising a first electrode and a second electrode.

One specific example of industrial electrification of recycling and material manufacturing processes in accordance with various embodiments is the production of lime (e.g., $Ca(OH)_2$) produced using renewable energy as illustrated in FIG. 1 in which a specific example system 200 is shown for generating cement. For example, a reactor may be a neutral-water electrolyzer 202 and the power source may be a renewable energy power source 206 (e.g., providing electricity from wind energy, solar energy, etc.). As a specific example, the neutral-water electrolyzer 202 may be an electrochemical reactor 300 as illustrated in FIG. 2. As illustrated in FIG. 1, the electrochemical decarbonation reactor (decarbonation cell 202) powered by renewable electricity from renewable energy source 206 converts $CaCO_3$ to $Ca(OH)_2$ for use in cement synthesis by a cement plant kiln 208. The decarbonation cell 202 uses the pH gradient produced by neutral-water electrolysis to dissolve $CaCO_3$ at the acidic anode and precipitate $Ca(OH)_2$ where the pH≥12.5. Simultaneously, $H_2$ is generated at the cathode and $O_2/CO_2$ are generated at the anode. These gas streams can serve several alternative roles in a sustainable production system. $CO_2$ can be directly captured for carbon capture and sequestration (CCS). Electricity or heat can be generated from the $H_2$ and $O_2$ via fuel cells 204 or combustors 205. The $O_2/CO_2$ oxy-fuel can be recirculated to the kiln 208 for cleaner combustion in the cement sintering cycle. $CO_2$ reuse and utilization ($CO_2U$) concepts can be employed, such as use in enhanced oil recovery (EOR) or production of liquid fuels. In some embodiments, the system comprises a reactor (e.g., an electrochemical reactor or other type reactor). In some embodiments, the reactor comprises the first electrode and the second electrode. For example, in some embodiments, the first electrode is electrochemically coupled to the second electrode in the reactor. FIG. 2 illustrates an example of such a reactor 300 including a first electrode 301 and the second electrode 302. In accordance with some embodiments, the production of the base by the first electrode (e.g., 301) results in an alkaline region (e.g., any alkaline region described herein) near the first electrode (e.g., within the half of the reactor compartment that is closest to the first electrode). For example, in some instances, the fluid adjacent the first electrode (e.g., the alkaline region) has a higher pH than fluid further away from the first electrode. In some embodiments, the second electrode (e.g., 302) is configured to produce an acidic output (e.g., any of the acids described herein). In certain embodiments, the acidic output is produced as a result of an electrochemical reaction in the second electrode. In some embodiments, the first mode of the reactor comprises producing acid near the second electrode (e.g., acid is produced as a result of an electrochemical reaction in the second electrode). In certain embodiments, the first electrode (e.g., cathode (e.g., 301)) is configured to produce hydrogen gas, such that hydrogen gas can be produced near the first electrode (e.g., the hydrogen gas is produced as a result of an electrochemical reaction in the first electrode). In some instances, running the reactor in the first mode comprises producing hydrogen gas (e.g., hydrogen gas and base) near the first electrode (e.g., hydrogen gas is produced as a result of an electrochemical reaction in the first electrode). In some instances, the hydrogen gas and/or base are produced near the first electrode by reduction of water near the first electrode. In certain embodiments, the second electrode (e.g., anode (e.g., 302)) is configured to produce oxygen, such that oxygen gas can be produced near the second electrode (e.g., the oxygen gas is produced as a result of an electrochemical reaction in the second electrode). In certain cases, running the reactor in the first mode comprises producing oxygen gas (e.g., oxygen gas and acid) near the second electrode (e.g., oxygen gas is produced as a result of an electrochemical reaction in the second electrode). In some instances, the oxygen gas and/or acid are produced near the second electrode by oxidation of water near the second electrode.

In some embodiments, the system is configured to allow oxygen gas to diffuse and/or be transported to a location near the first electrode (e.g., 301) (e.g., from a location near the second electrode (e.g., 302)). For example, in some cases, the system is configured to allow oxygen gas to diffuse and/or be transported to fluid near the first electrode (e.g., 301), such that the oxygen gas could be involved in an electrochemical reaction in the first electrode, from fluid near the second electrode, after the oxygen gas was produced as a result of an electrochemical reaction in the second electrode.

According to certain embodiments, the system is configured to allow the oxygen gas to be reduced near the first electrode (e.g., 301) (e.g., the oxygen gas is reduced as a result of an electrochemical reaction in the first electrode). In some embodiments, reducing the oxygen gas near the first electrode comprises production of a base. In certain embodiments, the production of a base is advantageous because it increases the overall amount of base produced at the first electrode.

In some embodiments, the system is configured to allow hydrogen gas to diffuse and/or be transported to a location near the second electrode (e.g., 302) (e.g., from a location near the first electrode (e.g., 301)). For example, in some cases, the system is configured to allow hydrogen gas to diffuse and/or be transported to fluid near the second electrode, such that the hydrogen gas could be involved in an electrochemical reaction in the second electrode, from fluid near the first electrode, after the hydrogen gas was produced as a result of an electrochemical reaction in the first electrode.

According to certain embodiments, the system is configured to allow the hydrogen gas to be oxidized near the second electrode (e.g., 302) (e.g., hydrogen gas is oxidized as a result of an electrochemical reaction in the second electrode). In some embodiments, oxidizing the hydrogen gas near the second electrode comprises production of acid. In certain embodiments, the production of acid is advantageous because it increases the overall amount of acid produced at the second electrode.

In some embodiments, the system comprises a separator (e.g., 303). In certain embodiments, the separator is configured to allow oxygen gas produced at the second electrode (e.g., 302) to diffuse to the first electrode (e.g., 301) and/or to allow hydrogen gas produced at the first electrode to diffuse to the second electrode. For example, in some embodiments, the separator is permeable to oxygen gas and/or hydrogen gas.

Figure 3:
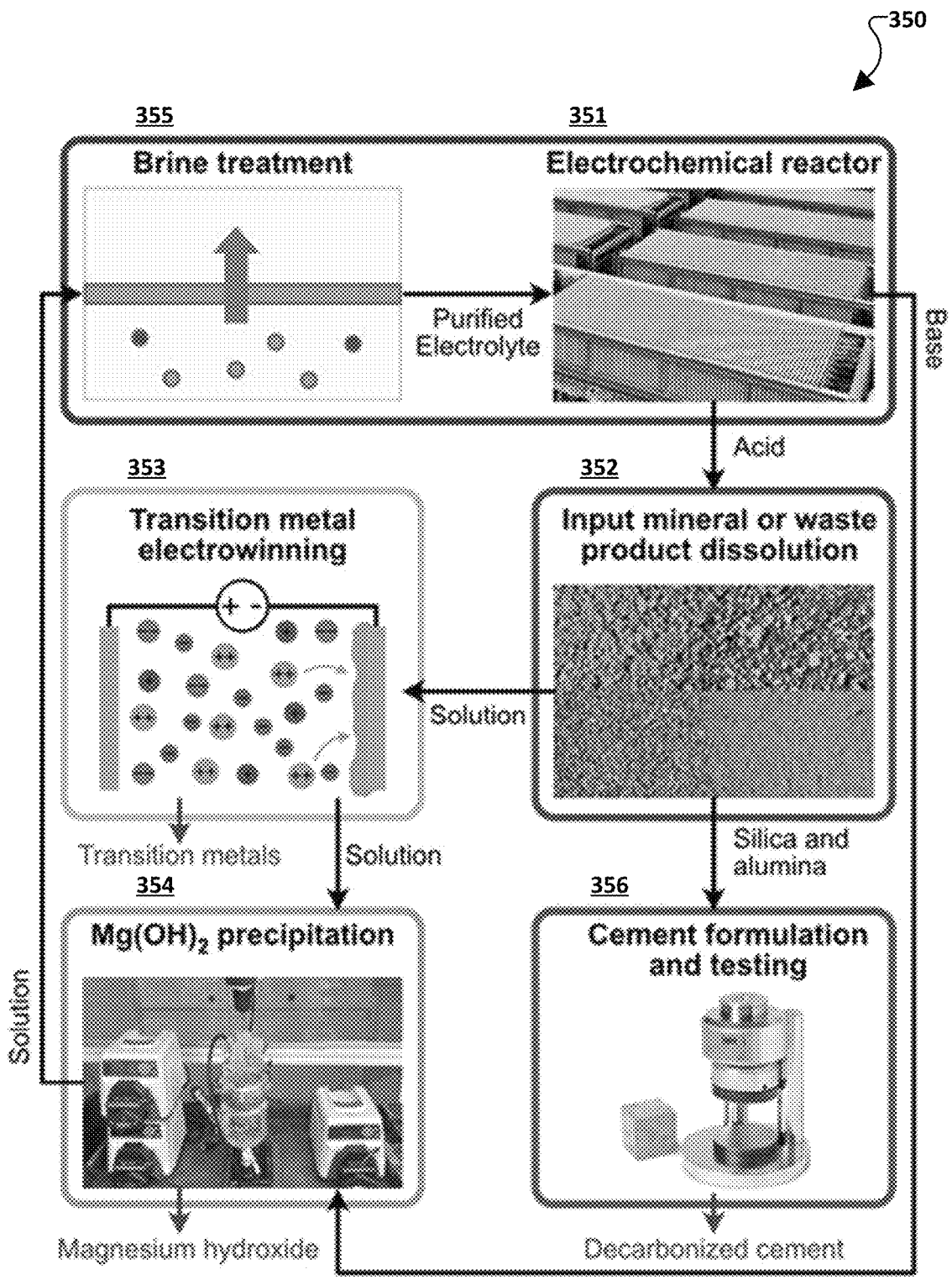
FIG. 3 illustrates a process flow of example unit operations to convert input materials into products using an acid and a base produced by an electrolyzer in accordance with various embodiments.

FIG. 3 illustrates a process flow of example unit operations of a method 350 to convert input materials into products using an acid and a base produced by an electrolyzer (e.g., 202, 300, etc.) in accordance with various embodiments.

The method 350 may begin at step 351 with an electrochemical reactor that produces strong acids and bases using intermittent renewable electricity. For example, the electrolyzer for acid and base production that is not damaged by impurities introduced from rock and ash, nor by power cycling in response to intermittent renewable electricity supply. Steps 352, 353, 354, and 355 may represent several subsequent chemical processing steps. The acid may be used to leach alkaline, alkaline earth, and transition metals from the input material in step 352, leaving behind acid-insoluble silica and alumina, which are separated by filtration. For example, the input materials may be $(Mg,Fe)_2SiO_4$ olivines and/or coal ash. The transition metals may be recovered from the acidic solution by electrowinning in step 353, and the alkaline earth elements may be precipitated as metal hydroxides using the base in step 354. The remaining salt brine will be purified and recycled to the electrolyzer in step 355. In step 356 $CO_2$-neutral pozzolanic cements may be made using reactive aluminosilicates produced using this process. The method 350 may simultaneously utilize low value minerals and wastes, prevent environmental contamination, and decrease $CO_2$ emissions from the production of valuable materials, directly reducing greenhouse gas emissions and improving energy efficiency in all economic sectors.

Various embodiments may include decarbonized pozzolanic cements, such as $CO_2$-neutral pozzolanic cements formed at step 356, containing the reactive, disordered aluminosilicates produced through leaching of bottom ash and olivine. These form-fit-function replacements for portland cement may directly apply one of the output products of the embodiment processes to make a major impact by decarbonizing cement, the largest single industrial $CO_2$ emitter.

Various embodiments may provide an integrated solution for simultaneously utilizing low value minerals and wastes, preventing environmental contamination, and decreasing GHG emissions from the production of valuable materials. Various embodiments may eliminate both process and chemical emissions. All steps may occur near room temperature, so no heating may be required. The only energy input may come from intermittent renewable electricity, which prevents all process emissions from fossil fuel combustion. In addition, the input materials are decarbonized, so there are no chemical $CO_2$ emissions.

Based on the availability and composition of the input materials shown in Table 1, if extraction of olivine were increased to 10 Mt/y, it is estimated that in the US market for various embodiment processes could produce enough silica for ≥25 Mt/y of pozzolanic cement and ≥3 Mt/y magnesium hydroxide, eliminating at least 25 Mt/y of $CO_2$ emissions.

TABLE 1

| Input Material | $SiO_2$ Content (wt %) | MgO Content (wt %) | Other Value-Added Elements | US Annual Production (Mt/y) | US Reserve (Mt) |
| --- | --- | --- | --- | --- | --- |
| Bottom ash | 40-50% | 0.5-5% | Ca, Al, Fe | 10 | >200 |
| Olivine | 29-43% | 0-57% | Fe, Mn, Ni, Co, Cr | 0.25 | 1,900 |

Various embodiment processes may produce pozzolanic cements, $Mg(OH)_2$, and at least one transition metal at cost parity with current production processes. Various embodiments may enable production of pozzolanic cements at ≤0.23 kg $CO_2$/kg cement and ≤\$120/ton, and $Mg(OH)_2$ at ≤0.62 kg $CO_2$/kg $Mg(OH)_2$ and ≤\$375/ton, representing at least 75% $CO_2$ reduction and cost parity with current production techniques.

Various embodiments may include electrochemical acid and base production. For example, chlor-alkali plants may be examples of large-scale electrolytic reactors that operate near ambient temperature and utilize aqueous electrolytes. In various embodiments, chlor-alkali plants may be used to produce HCl and NaOH from NaCl. In various embodiments, neutral pH electrolyzers may be used to directly generate acids and base solutions from salt brines, while also producing $H_2$ and $O_2$ gases as byproducts.

Various embodiments may include an impurity and intermittent electricity-tolerant electrolyzer. Various embodiments may include chlor-alkali and/or neutral pH electrolysis systems for acid and base production. Various embodiment electrolyzers may demonstrate improved impurity tolerance and resistance to damage from intermittent electricity inputs. Various embodiments may include an electrochemical cell design that shows ≤5% decrease in energy input requirement (KJ/kg NaOH) after 7 days on/off cycling during an accelerated durability test with representative impure salt brine (≥50 ppm calcium, magnesium, and iron).

Various embodiment improvements to electrolyzer design may not enable complete elimination of the brine purification steps, such as steps 355 of method 350, or unlimited instantaneous on-off power cycling. In various embodiments, even if the electrolyzers is not completely tolerant to all impurities or unlimited power cycling, the electrolyzer may be coupled with brine treatment and/or energy storage systems, which may be expected to be lower cost than conventional electrolyzers would require. For example, the electrolyzer may be coupled with a brine treatment such that steps 355 and 351 may be performed.

Various embodiments may provide an improved electrolyzer tolerance to impure salt brines. In various embodiments, the acid and base concentrations generated in the electrolyzers may be reduced. Chlor-alkali electrolysis can produce acid/base concentrations up to 10 M. These harsh solutions can cause rapid impurity precipitation, damaging the cells. In various embodiments, reducing the acid and base concentration of 10 M by 10 times to 10,000 times may prevent impurity precipitation and cell damage.

In various embodiments, membranes in the electrolyzer may be replaced with porous separators and/or membranes (and separators) may be eliminated entirely. For example, diaphragm-style chlor-alkali electrolyzers and/or other type diaphragm cells, may be used as the diaphragm-style cells may have lower capital costs and greater resistance to brine impurities than membrane cells. The increasing availability of inexpensive renewable electricity and the greater impurity tolerance may make diaphragm chlor-alkali electrolyzers appropriate for use in various embodiments. Eliminating membranes may improve impurity tolerance and reduce cost. Various embodiments may include a flow-through membraneless cell architecture, as well as systems that decouple the two key reactions into two separate independent vessels using redox shuttles or intercalation electrodes.

Various embodiments may include electrolyzers, such as chlor-alkali and neutral pH electrolyzers, having improved tolerance to power cycling. Various embodiments may include reversible polarity electrodes from conductors and catalysts stable at both oxidative and reductive potentials. In various embodiments, periodically reversing the cell polarity, may remove deposited impurities or reverse corrosion at each electrode to overcome the fouling associated with duty cycling. Various embodiments may include sacrificial anodes or cathodes to protect the electrodes. Sacrificial anodes may depolarize metal structures, enabling corrosion of the anode while protecting the valuable metal. Sacrificial anodes or cathodes may be employed for the electrolyzer electrodes to make them stable against corrosion upon rapid shutdown. In some embodiments, the system may be purged with fresh water to rapidly reach neutral pH conditions.

Various embodiments may include capturing the $H_2$ and $O_2$ byproducts from neutral pH electrolysis, and then combusting them or consuming them in a fuel cell to produce electricity during periods of low renewable electricity supply.

Various embodiments may include chemically assisted comminution (chemo-mechanical) approaches to leach soluble metals from the input materials, leaving behind fine, high surface area, disordered aluminosilicate materials. Various embodiments may include filtration techniques to efficiently recover these insoluble solids. Various embodiments may include simultaneously leaching ≥75% of the Mg and Fe with comminution of the insolubles to a P80 of ≤50 µm. Various embodiments may include ≥95% recovery of the insoluble solids from the leachate solution. Some embodiments may include mechanical grinding before or after chemical leaching.

Various embodiments may include chemical leaching of metals from rock and ash input materials. In various embodiments, metals may be recovered from the input materials via acid leaching. For example, metals may be recovered from coal ash and/or olivine as input materials. Various embodiments may include chemically assisted comminution of the input materials to produce insoluble aluminosilicate particles that are small, high surface area, and reactive. In various embodiments, chemical leaching may be combined with thermal and/or mechanical treatments (e.g., heating or grinding) to achieve further particle comminution. Various embodiments may include continuous separation of the liquid leachate solution and insoluble solids. The solids may be removed to prepare the leachate for metal recovery via electrowinning and/or to recover the aluminosilicates for use in pozzolanic cements.

Various embodiments may include transition metal electrowinning. Various embodiments may include advanced electrode and reactor designs configured to improve the efficiency of metal recovery from mixed-metal solutions with constituents varying widely in concentrations. Transition metal electrowinning may purify the salt brine to a moderate level acceptable for our impurity tolerant electrolyzers. Various embodiments may include electrowinning of ≥75% of the target metals from a representative olivine or ash leachate. Various embodiments may include combining filtration and electrowinning.

Various embodiments may include configuring electrowinning reactors and/or electrowinning sequences to have a selected degree of selectivity and/or recovery rate of target metals from a solution. Target metals may include Fe, Cu, Co, and Ni. The efficiency and selectivity may be selected based on combinations of the electrochemical behavior and analysis of the electrodeposits and remaining leachate. Various embodiments may include configuring electrowinning reactors tailored to produce fluid flow fields that precisely control mass transport of the active species.

Various embodiments may include magnesium hydroxide precipitation. Various embodiments may include a continuous reactor and process conditions to react $Mg^{2+}$ ions with NaOH produced by the electrolyzer, precipitating pure $Mg(OH)_2$. These brines may also contain $Ca^{2+}$ ions which may precipitate as $Ca(OH)_2$. Various embodiment processor may be controlled to separate these alkali earth hydroxides based on their different solubility vs. pH curves. Various embodiments may produce a product stream consisting of ≥90% wt $Mg(OH)_2$ with ≥80% recovery of $Mg^{2+}$ from a representative leachate solution. Various embodiments may include a filtration throughput of ≥5 g/(m²·s) dry $Mg(OH)_2$ with recovery of ≥90% of $Mg(OH)_2$ solids from the suspension. Various embodiments may include a feedstock solutions containing both $Ca^{2+}$ and $Mg^{2+}$, and precipitating pure $Mg(OH)_2$ without any $Ca(OH)_2$ by control of the pH to within the range of 9-11. In various embodiments, for concentrated NaOH, the NaOH may be diluted from the electrolyzer.

In various embodiments, the aqueous process stream may contain both $Ca^{2+}$ and $Mg^{2+}$ ions in varying concentrations depending on the input material. In various embodiments, the NaOH from the electrolyzer may be reacted with $Mg^{2+}$ and precipitate pure $Mg(OH)_2$ with little or no $Ca(OH)_2$. The difference in solubility between $Ca(OH)_2$ and $Mg(OH)_2$ may be the basis for this purifying precipitation. Based on the solubility product constants, $Mg^{2+}$ ions may be expected to precipitate out as $Mg(OH)_2$ at pH>9, and $Ca^{2+}$ ions to precipitate out as $Ca(OH)_2$ at pH>11.35, though in impure mixed brine solutions, the exact pH values may differ due to common ion effects and differences in particle nucleation and growth kinetics.

In various embodiments, NaOH and $Mg^{2+}/Ca^{2+}$ solutions may be input feeds and the $Mg(OH)_2$ solids may be collected by filtration. In some embodiments, the concentrated base with pH>14 produced in the electrolyzer may be used without dilution to minimize liquid volume and equipment size. To achieve reaction pH<11.35 to precipitate only $Mg(OH)_2$, the NaOH feed may be split through several inlets dispersed throughout the reactor to ensure rapid mixing and homogeneous bulk concentration. In some embodiments, the base may be introduced in several steps via several reactors in series, effectively keeping pH below a set threshold across all reactors.

In various embodiments, the reactor conditions may be optimized to produce a desired particle size distribution, which will directly determine the ease of filterability of the product and minimize the cost of the liquid-solid separation required to isolate the $Mg(OH)_2$. Varying reactor parameters including pH, flow rate, temperature, residence time, and agitation effect particle size and/or morphology. Various embodiments may include pre-seeding and recycle streams as a means of increasing primary particle size.

Various embodiments may include controlling the $Mg(OH)_2$ yield, purity, and particle size to meet specifications despite variation in the input $Mg^{2+}$ and $Ca^{2+}$ concentrations. Various embodiments may include monitoring and control strategies to appropriately adjust flow rates or other operating conditions for feedstocks with varying composition.

Various embodiments may include formation of decarbonized pozzolanic cements using disordered aluminosilicates. Various embodiments may include decarbonized pozzolanic cement formulations that meet relevant ASTM standards. In various embodiments, pozzolanic reactivity may be equal to or better than most commercially available pozzolans. In various embodiments, pozzolanic reactivity may be shown by heat release ≥200 J/g SCM and a $Ca(OH)_2$ consumption ≥40 g per 100 g SCM, as measured according to standard $R^3$ methods. In various embodiments, compressive strength ≥28 MPa at 28 days may be achieved for a pozzolanic cement mortar containing olivine- or coal ash-derived pozzolan, hydrated lime, and ≤ 40% wt portland cement, such as the strength requirement is specified in ASTM C1157: Performance Specification for Hydraulic Cement. In various embodiments, compressive strength may be increase by various approaches, including: (1) decreasing the particle size of the pozzolans through milling; (2) elevated heat curing; and/or (3) addition of chemical activators such as gypsum and NaOH.

Various embodiments may achieve widespread adoption and may increase the value of the input materials by more than the cost of processing. Preliminary analysis has shown the various embodiments increase the value of the starting materials by approximately two times the processing cost: for example, with a $75-$100 per ton of processing costs resulting in $125-$220 per ton value increase from cheap and abundant input materials.

Example input materials used in accordance with various embodiments, such as coal bottom ash and olivine, are available in vast quantities and are among the least valuable materials on Earth. As shown in Table 1, hundreds of millions of tons of bottom ash exist in the USA, and its owners are paying more than $50/ton for its disposal. Olivine is the principal component of Earth's upper mantle, and crushed olivine can be purchased for $10/ton. The three most prevalent and valuable extractable components of bottom ash and olivine are Mg (precipitated as $Mg(OH)_2$), $Fe_2O_3$ (electrowon into Fe), and pozzolan (insoluble aluminosilicates that are isolated by filtration). The value and extraction costs of these materials are shown in Table 2.

TABLE 2

| Extracted material | Value, $/ton | Processing cost, $/ton | Value created, $/ton | Value/cost ratio |
|---|---|---|---|---|
| $Mg(OH)_2$ | 375 | 190 | 185 | 2.0 |
| Fe | 215 | 105 | 110 | 2.0 |
| Pozzolan | 70 | 5 | 65 | 14.0 |

Figure 4:
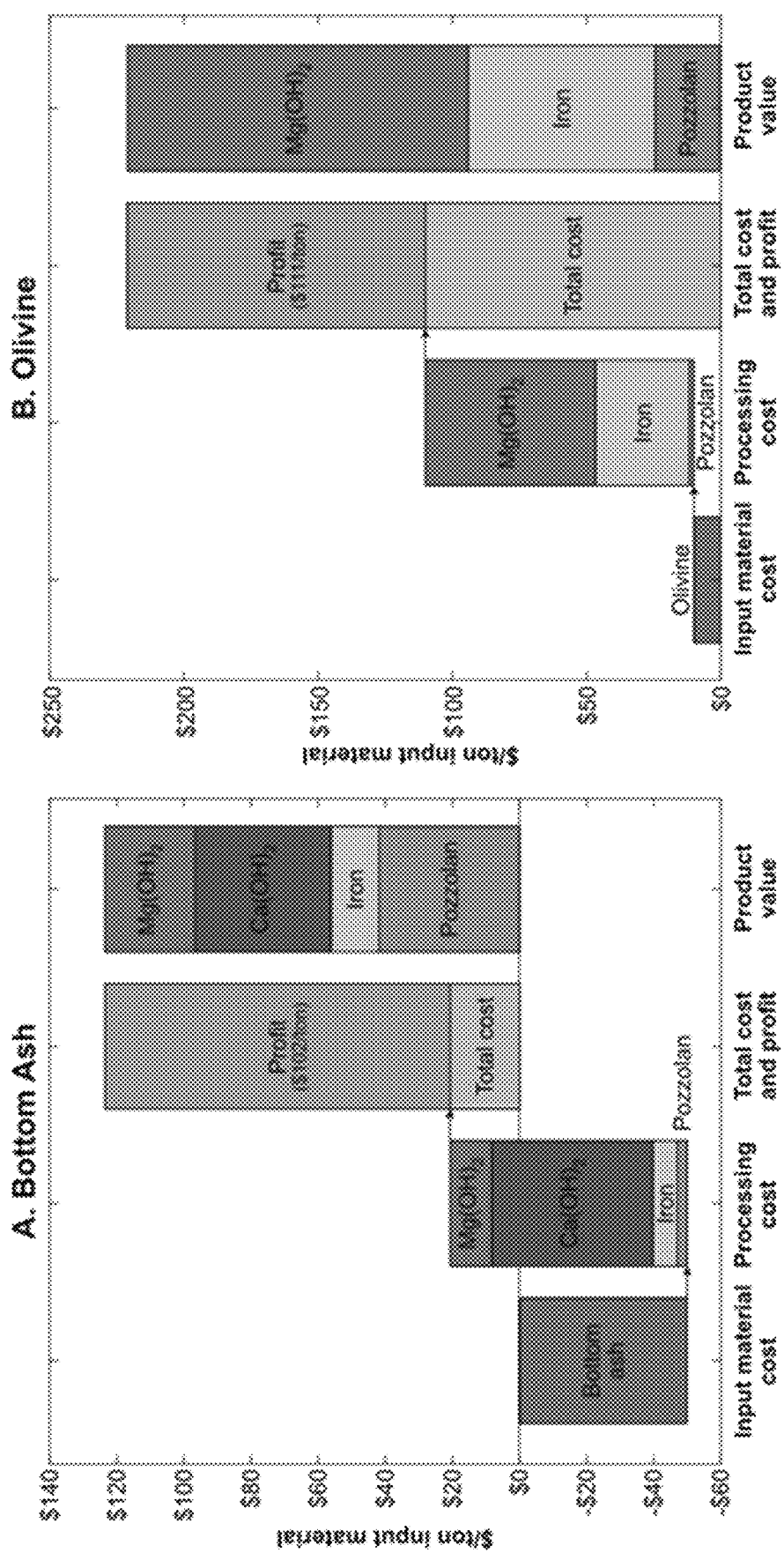
FIG. 4 illustrates graphs of costs, profits, and product values for bottom ash and olivine as example input materials in accordance with various embodiments.

The $Mg(OH)_2$ extraction cost was estimated at a production rate of 500 kt/y $Mg(OH)_2$ and electricity price of 2 ¢/kWh with 70% capacity factor. The marginal cost of Fe extraction was calculated assuming Fe is electrowon from a chloride solution with an overpotential of 0.3 V above the thermodynamic minimum cell voltage at an electricity cost 3 ¢/kWh available 100% of the time, and that electricity is 70% of the total cost of Fe production. Pozzolan was assumed to be worth $70/ton, though it could be worth $25 to $120/ton depending on material performance and local availability. The marginal extraction cost of pozzolan was taken to be the cost of owning and operating a large-scale rotary drum filter (>100 kt/y) to separate the aluminosilicates from the leachate solution. The analysis shows that the value of the extracted materials is 2-14 times greater than the cost of extraction, and the total value created is approximately twice the total processing cost. Factoring in the low or negative input material costs, profits of >$100/ton input material are projected for both inputs, as shown in FIG. 4.

In various embodiments, all energy input to the various processes may come from renewable electricity, therefore various embodiments may eliminate all fossil fuels and all "chemical" and "process" emissions. Various embodiments may provide an integrated system that may reduce $CO_2$ emissions from cement and $Mg(OH)_2$ production by ≥75% at cost parity with current processes.

Various embodiments may reduce, or minimize, intermittent operation of all equipment downstream of the electrolyzer by utilizing tank storage of the acid and/or base reagents as a buffer. Acid and/or base storage may maximize the capacity factor and minimize cost of equipment while accommodating intermittent electricity input. Our preliminary TEA factored in a 70% capacity factor for the intermittent electrolyzer based on a combination of solar and wind energy, as well as the sizes and costs of storage tanks. Under these assumptions, the predicted process economics are favorable.

In various embodiments, drying of the precipitated products may be performed. In various embodiments, drying may be by use of: 1) an electric heat powered by renewable electricity; and/or 2) waste heat from the chlor-alkali system's HCl acid burner, which operates at approximately 2000° C.

In various embodiments, most impurities may be removed from the brine by electrowinning and in the $Mg(OH)_2$ precipitation step (only $Ca(OH)_2$ and the alkali metal hydroxides require higher pH to precipitate). In the event that further brine purification may be desired and/or necessary, ion exchange or nanofiltration may be used to further purify the brine.

Various embodiments may include systems for processing material inputs using an electrochemical reactor. The material inputs may include a variety of natural and/or man-made substances such as mafic and/or ultramafic minerals, olivine, limestone, dolomite, fly ash, coal bottom ash, or other materials. The electrochemical reactor may be powered by the input of electricity and produces chemicals, such as acids and bases, or the precursors thereof. The acids and bases may be used to react with the input materials, and through these reactions, the input materials may be purified, separated, activated, and/or otherwise modified into useful forms. In some embodiments, the acid produced by the electrolyzer is used to leach certain elements out of the input materials, and these elements are collected as pure metals by electrowinning or reacted with the base solution produced by the electrochemical reactor to precipitate metal salts, including metal hydroxides. In some embodiments, the output materials may be used directly, and in some embodiments the output materials may be further refined, reacted, or processed. In some embodiments, the outputs may include silicates useful as a supplementary cementitious material or a component of pozzolanic cement, calcium hydroxide useful as a component of pozzolanic cement, magnesium chloride or magnesium hydroxide useful as a feedstock for magnesium metal production, and/or iron, zinc, copper, or other metals. In some embodiments, the outputs are used to sequester carbon dioxide by forming metal carbonates, such as $Na_2CO_3$ or $MgCO_3$. Various embodiments systems may enable the manufacturing of multiple useful materials with low, zero, or negative carbon dioxide emissions.

In various embodiments, systems for processing material inputs may include one or more of a source of electricity, an electrochemical reactor, an input material delivery systems, chemical process equipment, mechanical process equipment, electrical process equipment, electrochemical process equipment, and/or subsystems configured to produce one or more output products. Specific examples of such sources of electricity, electrochemical reactors, input material delivery systems, chemical process equipment, mechanical process equipment, electrical process equipment, electrochemical process equipment, and/or subsystems configured to produce one or more output products may include the various sources and devices described above with reference to FIGS. 1 and 2.

In some embodiments, the source of electricity is at least in part a renewable source of electricity, including but not limited to electricity obtained from solar, wind, hydroelectric, geothermal, and/or nuclear sources. In some embodiments the electricity used by the system may be at least 90% from such renewable sources, at least 80% from such renewable sources, at least 70% from such renewable sources, at least 60% from such renewable sources, at least 50% from such renewable sources, at least 40% from such renewable sources, at least 30% from such renewable sources, or at least 20% from such renewable resources. In some embodiments the electricity used by the system may be about 20% or more from such renewable sources, such as about 20% to about 30%, about 30% to about 40%, about 40% to about 50%, about 50% to about 60%, about 60% to about 70%, about 70% to about 80%, about 80% to about 90%, about 20% to about 90%, about 90% or greater, or above 90%. As a specific example, the renewable sources may include source 206 described above.

In some embodiments, the electrochemical reactor may include one or more electrochemical cells, each including two electrodes and an electrolyte. In some embodiments, the electrolyte includes an aqueous salt solution. In some embodiments, the electrodes includes one or more plates, meshes, cloths, films, sponges, or other morphologies of electrically conductive material. In some embodiments, one or more of the electrodes may additionally include catalyst materials to accelerate the rates of electrochemical reactions occurring at the electrodes. In some embodiments, the electrochemical cells may further include one or more membranes, diaphragms, or porous separators which may slow down or prevent the transport of certain molecular or ionic species between different compartments in the electrochemical reactor. In some embodiments, the electrochemical cells may include bipolar membranes that promote water dissociation into hydrogen and hydroxide ions.

The electrochemical reactor may be powered by the input of electrical energy. In some embodiments, the electrochemical reactor may be powered by electricity generated from renewable resources such as solar or wind energy. In some embodiments, the electricity input drives electrochemical oxidation and reduction reactions at the two electrodes (the anode and cathode, respectively). In some embodiments, the electricity input drives migration of ionic species in the electrolyte under the influence of an electric field, resulting in dissociation, separation, or enrichment of certain portions of the electrolyte with some chemical species. In some embodiments, the electrochemical reactor produces chemical outputs. In some embodiments, the electrochemical reactor produces one or more acids and/or one or more bases as outputs. In some embodiments, the electrochemical reactor is an electrolyzer. In some embodiments, the migration of ionic species in the electrolyte under the influence of an electric field may result in the production of acid and base, as in a bipolar membrane electrodialysis process. As a specific examples, the electrochemical reactor may include electrolyzer 202 and/or electrochemical reactor 300 described above.

In some embodiments, the electrochemical reactor may be a chloralkali electrolyzer. In these embodiments, the input to the process may be a solution of sodium chloride (NaCl) in water, and the outputs from the electrochemical reactor may include sodium hydroxide (NaOH), chlorine ($Cl_2$), and hydrogen ($H_2$). In some embodiments, the chlorine and hydrogen may be reacted with one another in an acid burner to create hydrochloric acid (HCl).

In some embodiments, the electrochemical reactor may be a neutral pH electrolyzer. In some embodiments, the electrochemical reactor may be a bipolar membrane electrodialysis unit. In such embodiments, the input to the reactor may be an aqueous salt solution. The salt may include one or more of sodium chloride, sodium nitrate, sodium perchlorate, sodium phosphate, sodium chlorate, sodium acetate, sodium sulfate, sodium bromide, sodium citrate, sodium carbonate, sodium oxalate, potassium chloride, potassium nitrate, potassium perchlorate, potassium phosphate, potassium chlorate, potassium acetate, potassium sulfate, potassium bromide, potassium citrate, potassium carbonate, potassium oxalate, ammonium chloride, ammonium nitrate, ammonium perchlorate, ammonium phosphate, ammonium chlorate, ammonium acetate, ammonium sulfate, ammonium bromide, ammonium citrate, ammonium carbonate, and/or ammonium oxalate. In some embodiments, the outputs from the electrochemical reactor may include one or more of the following acids in aqueous solution: hydrochloric acid, nitric acid, perchloric acid, phosphoric acid, chloric acid, acetic acid, sulfuric acid, bromic acid, citric acid, carbonic acid, and/or oxalic acid. In some embodiments, the outputs from the electrochemical reactor may include one or more of the following bases in aqueous solution: sodium hydroxide, potassium hydroxide, and/or ammonium hydroxide. In some embodiments, the acid and/or base solution output from the electrochemical reactor may also contain the input salt.

In some embodiments, the electrochemical reactor is an electrodialysis bipolar membrane reactor, including variants thereof, such as those with a single membrane separating two fluidic chambers and those with two membranes separating three fluidic chambers. In some embodiments, the electrochemical reactor is a membraneless electrolyzer, including variants in which fluid streams are separated or partitioned to reduce mixing of output streams of low and high pH.

In various embodiments, the one or more input materials may include a variety of naturally-occurring or man-made substances. In some embodiments, the input materials may include at least about 1%, about 2%, about 3%, about 5%, about 10%, about 20%, about 30%, about 40%, about 50%, about 60%, about 70%, about 80%, or about 90% by weight of inorganic compounds. In some embodiments, the input materials may include at least about 1% or greater by weight of inorganic compounds, such as 1-2%, 2-3%, 3-5%, 5-10%, 1-10%, 10-20%, 10-30%, 20-30%, 30-40% 40-50%, 50-60%, 60-70%, 70-80%, 80-90%, or 1-90% by weight of inorganic compounds. In some embodiments, the input materials contain oxides, hydroxides, carbonates, sulfides, sulfates, chlorides, or alloys of silicon, aluminum, iron, magnesium, calcium, sodium, potassium, nickel, copper, zinc, and/or manganese. In some embodiments, the input materials may one or more of include coal ash (bottom ash, fly ash, ponded ash, economizer ash, etc.), municipal solid waste incinerator ash, recycled or waste construction materials (e.g., crushed concrete, limestone, dolomite, and/or mafic and ultramafic rocks, such as olivine or serpentine, basalt, wollastonite, etc.), lime kiln dust, and/or cement kiln dust.

In some embodiments, the input material may be a solid. In some embodiments, the input material may be used in this system in its raw, unprocessed state. In some embodiments, the input material may be processed before it is used in this system. In some embodiments, the input material may be ground, pulverized, or milled to decrease the input particle size. In some embodiments, the input material may be in the form of rocks, pebbles, or aggregate. In some embodiments, the input material may be in the form of particles or powder.

In some embodiments, the input materials may contain greater than about 1%, 2%, 3%, 5%, 10%, 20%, 30%, 40% 50%, 60%, 70%, 80%, 90%, or 1-90% $SiO_2$ as a mass percentage of the total input mass.

In some embodiments, the input materials may contain greater than about 1%, 2%, 3%, 5%, 10%, 20%, 30%, 40% 50%, 60%, 70%, 80%, 90%, or 1-90% CaO as a mass percentage of the total input mass.

In some embodiments, the input materials may contain greater than about 1%, 2%, 3%, 5%, 10%, 20%, 30%, 40% 50%, 60%, 70%, 80%, 90%, or 1-90% MgO as a mass percentage of the total input mass.

In some embodiments, the input materials may contain greater than about 1%, 2%, 3%, 5%, 10%, 20%, 30%, 40% 50%, 60%, 70%, 80%, 90%, or 1-90% $Al_2O_3$ as a mass percentage of the total input mass.

In some embodiments, the input materials contain greater than about 1%, 2%, 3%, 5%, 10%, 20%, 30%, 40% 50%, 60%, 70%, 80%, 90%, or 1-90% $Fe_2O_3$ as a mass percentage of the total input mass.

In the preceding compositions, the molecular formulas are used as the mass basis for the material composition, but do not imply that the material is composed of these precise chemical species. For example, an olivine with the formula $MgFeSiO_4$ contains approximately 34.9% $SiO_2$ on a mass basis.

In various embodiments, chemical, mechanical, electrical, and/or electrochemical process equipment may be used to react the input material with one or more of the chemicals produced in the electrochemical reactor, to handle the reactants and/or products, and/or to produce and/or collect products of the system.

In various embodiments, the system includes chemical process equipment that may support the operation of the electrolyzer and to perform the reaction of the input material with the chemical outputs of the electrolyzer. In some embodiments, this process equipment may include one or more pumps, pipes, valves, tanks, conveyors, compressors, drums, turbines, pressure vessels, hoppers, mixers, presses, scales, flow meters, heat exchangers, refrigerators, boilers, cooling towers, mills, grinder, condensers, furnaces, kilns, centrifuges, cyclones, electrostatic precipitators, filters, gravity separators, screens, thickeners, clarifiers, dryers, evaporators, ion exchange columns, membranes, batch reactors, stirred tank reactors, plug flow reactors, crystallizers, slurry reactors, and/or sensors.

In various embodiments, the chemical process equipment may include subsystems of the entire system. Said subsystems may serve to separate, concentrate, dilute, and/or otherwise treat the reagents used in the system, including but not limited to: acid burners, leaching reactors, and brine treatment subsystems. Acid burners may be used for producing acid from gaseous products of the electrochemical reactor. A non-limiting example is an acid burner which produces HCl from chlorine gas and water, or chlorine and hydrogen gas. Leaching reactors may be used to dissolve or selectively dissolve components of the input materials. Leaching reactors may use aqueous solutions that are acidic or basic, or nonaqueous solvents for selective dissolution. Brine treatment subsystems may be used for purifying process solutions that are recirculated to the electrochemical reactor.

In various embodiments, the subsystems may include electrowinning subsystems, solvent separation subsystems, ion exchange resin subsystems, filtering subsystems, and/or precipitation subsystems.

In various embodiments, subsystems producing one or more output products, may include, but are not limited to electrowinning, electrorefining, and/or electrophoretic-deposition reactors to collect soluble or colloidal or particulate species from solutions and suspensions. Electrowinning reactors may be used to electrodeposit dissolved metals from solution as metallic products. Electrorefining reactors may be used to further purify electrowon metal mixtures. Electrophoretic deposition reactors may be used to collect suspended particulate matter from a suspension. In some embodiments, said electrowinning or electrorefining reactors may use one or more electrodes of higher specific surface area than a planar electrode, such as porous, fibrous, woven, or reticulated structures that are electronically conductive. In one specific embodiment, said electrodes comprise nanoscale conductors, including but not limited to carbon nanotubes or metal nanowires. In some embodiments the specific surface area of such electrodes is greater than about 5 $m^2/g$, greater than about 10 $m^2/g$, from about 5 $m^2/g$ to about 10 $m^2/g$, greater than about 30 $m^2/g$, from about 5 $m^2/g$ to about 30 $m^2/g$, greater than about 50 $m^2/g$, greater than about 100 $m^2/g$, or from about 5 $m^2/g$ to about 100 $m^2/g$.

In various embodiments, subsystems producing one or more output products, may include electrical or electrochemical reactors that produce at least in part a metal or metal alloy as a product from the input materials, including but not limited to electric arc furnaces for steel production, Hall reactors for producing aluminum metal, and/or electrochemical reactors producing magnesium metal from anhydrous magnesium chloride (for example, the Dow, I.G. Farben or Norsk Hydro processes).

In various embodiments, subsystems producing one or more output products, may include thermal decomposition processes and reactors, such as calciners for decomposing metal salts, and/or metallothermal reactors, such as those used for the Pidgeon/Bolzano process for producing magnesium metal.

In various embodiments, subsystems producing one or more output products, may include carbonation reactors, used to react carbon dioxide with an intermediate product of the system. As a non-limiting example, such reactors may react dissolved or precipitated sodium or magnesium hydroxide with carbon dioxide to form sodium or potassium carbonate.

In various embodiments, subsystems producing one or more output products, may include separation reactors, which may allow removal of particular species or concentration of others. Such devices may use precipitation, solvent extraction, phase separation, absorption by solid media such as ion exchange resins or zeolites, osmotic pressure based separation, and filtering.

In some embodiments, a base produced in the electrochemical reactor may be used in one or more ways, such as the base being sold as a commercial product, the base being used to leach or dissolve some components of an input material, the base being reacted with carbon dioxide ($CO_2$) to make a carbonate or bicarbonate for the purpose of capturing and/or sequestering carbon dioxide, and/or the base being reacted with an aqueous solution created by dissolving or leaching an input material with the acid solution.

In various embodiments, the base may be used to leach or dissolve some components of an input material. This may create a suspension, slurry, or mixture containing solid particles and an aqueous solution containing dissolved atomic, molecular, or ionic species that were leached from the input material. In some embodiments, the remaining solid particles may be insoluble in the basic solution. In some embodiments, the insoluble solids may be purified by leaching out all of the soluble components. In some embodiments, the suspension or slurry containing the aqueous solution and the solids may be separated by settling, filtration, centrifugation, or another technique. In some embodiments, the solids may be washed and/or dried to produce a purified solid output material.

In various embodiments, the base may be reacted with carbon dioxide ($CO_2$) to make a carbonate or bicarbonate for the purpose of capturing and/or sequestering carbon dioxide. For example, the sodium hydroxide solution or solid NaOH may react with carbon dioxide to make sodium carbonate ($Na_2CO_3$) or sodium bicarbonate ($NaHCO_3$), or magnesium hydroxide solution or solid $Mg(OH)_2$ may react with carbon dioxide to make magnesium carbonate ($MgCO_3$).

In various embodiments, the base may be reacted with an aqueous solution created by dissolving or leaching an input material with the acid solution. For example, the base may be reacted with an aqueous solution created by dissolving or leaching an input material with the acid solution as described further below.

In some embodiments, an acid produced in the electrochemical reactor may be used in one or more ways, such as the acid being sold as a commercial product, the acid being used to leach or dissolve some components of an input material, etc.

In various embodiments, the acid may be used to leach or dissolve some components of an input material. This may create a suspension, slurry, or mixture containing solid particles and an aqueous solution containing dissolved atomic, molecular, or ionic species that were leached from the input material. In some embodiments, the remaining solid particles may be insoluble in the acid solution. In some embodiments, the insoluble solids may be purified by leaching out all of the soluble components. In some embodiments, the suspension or slurry containing the aqueous solution and the solids may be separated by settling, filtration, centrifugation, or another technique. In some embodiments, the solids may be washed and/or dried to produce a purified solid output material.

In some embodiments, the solid output material from the acid dissolution process may consist primarily of a silicate or an aluminosilicate mineral. In some embodiments, the solid output material from the acid dissolution process may have a small particle size (e.g., a major diameter less than about 10 microns, less than about 5 microns, less than about 2 microns, less than about 1 micron, from about 10 microns to about 0.5 microns, or less than about 0.5 microns). In some embodiments, the solid output material from the acid dissolution process may be primarily amorphous (e.g., less than about 50% crystalline content, such as about 50% to about 30% crystalline content, less than about 30% crystalline content, about 30% to about 20% crystalline content, less than about 20% crystalline content, about 20% to about 10% crystalline content, less than about 10% crystalline content, about 10% to about 5% crystalline content, less than about 5% crystalline content, about 5% to about 2% crystalline content, about 50% to about 2% crystalline content, or less than about 2% crystalline content). In some embodiments, the solid output material from the acid dissolution process may have a high specific surface area (e.g., greater than about 3 $m^2/g$, greater than about 5 $m^2/g$, greater than about 10 $m^2/g$, greater than about 30 $m^2/g$, greater than about 50 $m^2/g$, greater than about 100 $m^2/g$, greater than about 300 $m^2/g$, greater than about 500 $m^2/g$, from about 3 $m^2/g$ to about 1000 $m^2/g$, or greater than about 1000 $m^2/g$). In some embodiments, this silica or aluminosilicate mineral may be used or sold as a valuable product. In some embodiments, this silica or aluminosilicate mineral may be used as pozzolan or supplementary cementitious material in cement, concrete, mortar, stucco, grout, shotcrete, or other construction materials. In some embodiments, this silica or aluminosilicate mineral may be used as a component of pozzolanic cement.

In some embodiments, the aqueous solution produced by reacting the input materials with acid may be sold, stored, or further processed. In some embodiments, the aqueous solution produced by reacting the input materials with acid may contain dissolved calcium, magnesium, iron, nickel, zinc, copper, manganese, sodium, or potassium ions. In some embodiments, the aqueous solution produced by reacting the input materials with acid may be processed via electrowinning, electrorefining, solvent separation, or other techniques to extract, purify, or separate certain of the constituents of the solution. In some embodiments, certain metals may be selectively removed from the aqueous solution produced by reacting the input materials with acid, creating purified metal outputs. For example, electrowinning may be used to remove iron, copper, nickel, zinc, or manganese from the aqueous solution. In some embodiments, these metals may be used or sold as valuable products.

In some embodiments, after certain components are reacted or separated out of the aqueous solution produced by reacting the input materials with acid, the remaining solution may be stored, sold, or used for another process. For example, electrowinning may be used to remove transition metals from the aqueous solution, leaving behind a solution comprising primarily magnesium chloride and/or calcium chloride. In some embodiments, the magnesium chloride and/or calcium chloride in solution may be captured as solids by evaporation, crystallization, or another process. The magnesium chloride and/or calcium chloride may be both present together in solution, in which case they may be collected together as a mixture of solid magnesium chloride and calcium chloride salts, or they may be separated and collected as purified magnesium chloride and calcium chloride. Alternatively, depending on the composition of the input material, the solution may contain primarily calcium chloride or primarily magnesium chloride without the other, and in this case the magnesium chloride or calcium chloride may be collected as a purified solid salt. The calcium chloride or magnesium chloride may be sold as valuable products. The magnesium chloride may be used as an input to a process for the production of magnesium metal. The calcium chloride may be used as an input to a process for the production of calcium metal.

In some embodiments, the aqueous solution produced by reacting the input materials with acid may be further reacted with a base produced by the electrochemical reactor. In some embodiments, this may result in a reaction such as a precipitation reaction. In some embodiments, certain constituents of the solution may precipitate as solid hydroxides, and this process may be used to extract, purify, or separate components of the solution. For example, the aqueous salt solution may be reacted with a base to precipitate calcium hydroxide and/or magnesium hydroxide from the aqueous solution. In some embodiments, this process may create a mixture, suspension or slurry of solid particles in an aqueous solution. In some embodiments, these solids may be collected or separated using settling, centrifugation, filtration, or another technique.

In some embodiments, calcium hydroxide ($Ca(OH)_2$) may be collected as a product and used as a component of cement, concrete, mortar, stucco, grout, shotcrete, or other construction materials. In some embodiments, the calcium hydroxide may be reacted with carbon dioxide to make calcium carbonate. This carbonation reaction may be done for the purpose of creating precipitated calcium carbonate, which may be sold or used as a valuable product. This carbonation reaction may be done for the purpose of sequestering $CO_2$ in mineral form. This carbonation reaction may be done as part of a construction material manufacturing or use process, such as the process of creating carbonated precast concrete forms.

In some embodiments, magnesium hydroxide ($Mg(OH)_2$) may be collected as a product and used as a component of cement, concrete, mortar, stucco, grout, shotcrete, or other similar construction materials. In some embodiments, the magnesium hydroxide may be reacted with carbon dioxide to make magnesium carbonate. This carbonation reaction may be done for the purpose of creating precipitated magnesium carbonate, which could be sold or used as a valuable product. This carbonation reaction may be done for the purpose of sequestering $CO_2$ in mineral form. This carbonation reaction may be done as part of a construction material manufacturing or use process. The magnesium hydroxide may also be used as an input to a magnesium metal manufacturing process. In some embodiments, the magnesium hydroxide may be reacted with hydrochloric acid to make magnesium chloride, which is then refined into magnesium metal and chlorine in an electrolytic process. In some embodiments, this magnesium hydroxide may be an input into the Dow process, Farben process, Norsk Hydro process, another electrolytic process for the production of magnesium metal. In some embodiments, this magnesium hydroxide may be an input into the Pidgeon process, Bolzano process, Magnetherm process, or another metallothermic process for the production of magnesium metal.

In some embodiments, the precipitation of metal hydroxides may result in a mixture, suspension, or slurry of solid particles in an aqueous solution. In some embodiments, the aqueous phase of this suspension may contain the salt that was initially fed into the electrochemical reactor as the feedstock for the production of the acid and the base. In some embodiments, after the solid particles are separated from the aqueous solution, the aqueous salt solution may be recycled to the electrochemical reactor. In some embodiments, this may reduce or eliminate the need for inputting fresh salt into the electrochemical reactor as a feedstock for the acid and base production. In some embodiments, the aqueous solution may also contain impurities which could damage the electrochemical reactor by scaling, fouling, or otherwise degrading the electrodes, membranes, or other components. In some embodiments, the aqueous solution may be purified to remove harmful impurities using an ion exchange process, a membrane filtration process, an electrowinning process, a precipitation process, or another process or combination of processes. In some embodiments, the aqueous salt solution may be recycled to the electrolyzer after it is purified to remove harmful impurities. In some embodiments, the aqueous salt solution may be diluted, concentrated by evaporation, or concentrated by the addition of additional salt before it is recycled to the electrolyzer.

Figure 5:
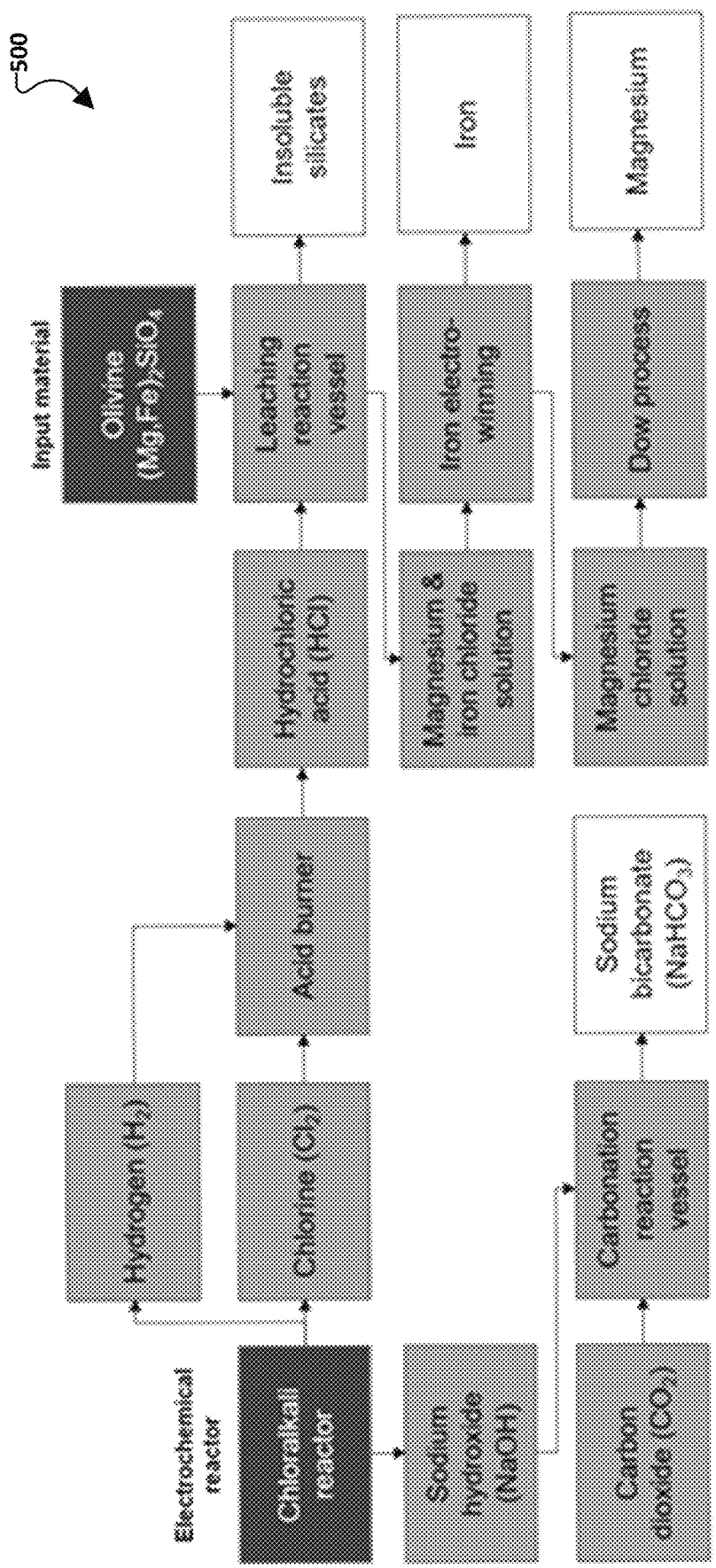
FIGS. 5-7 illustrate example processes in accordance with various embodiments for processing material inputs using an electrochemical reactor.
Figure 6:
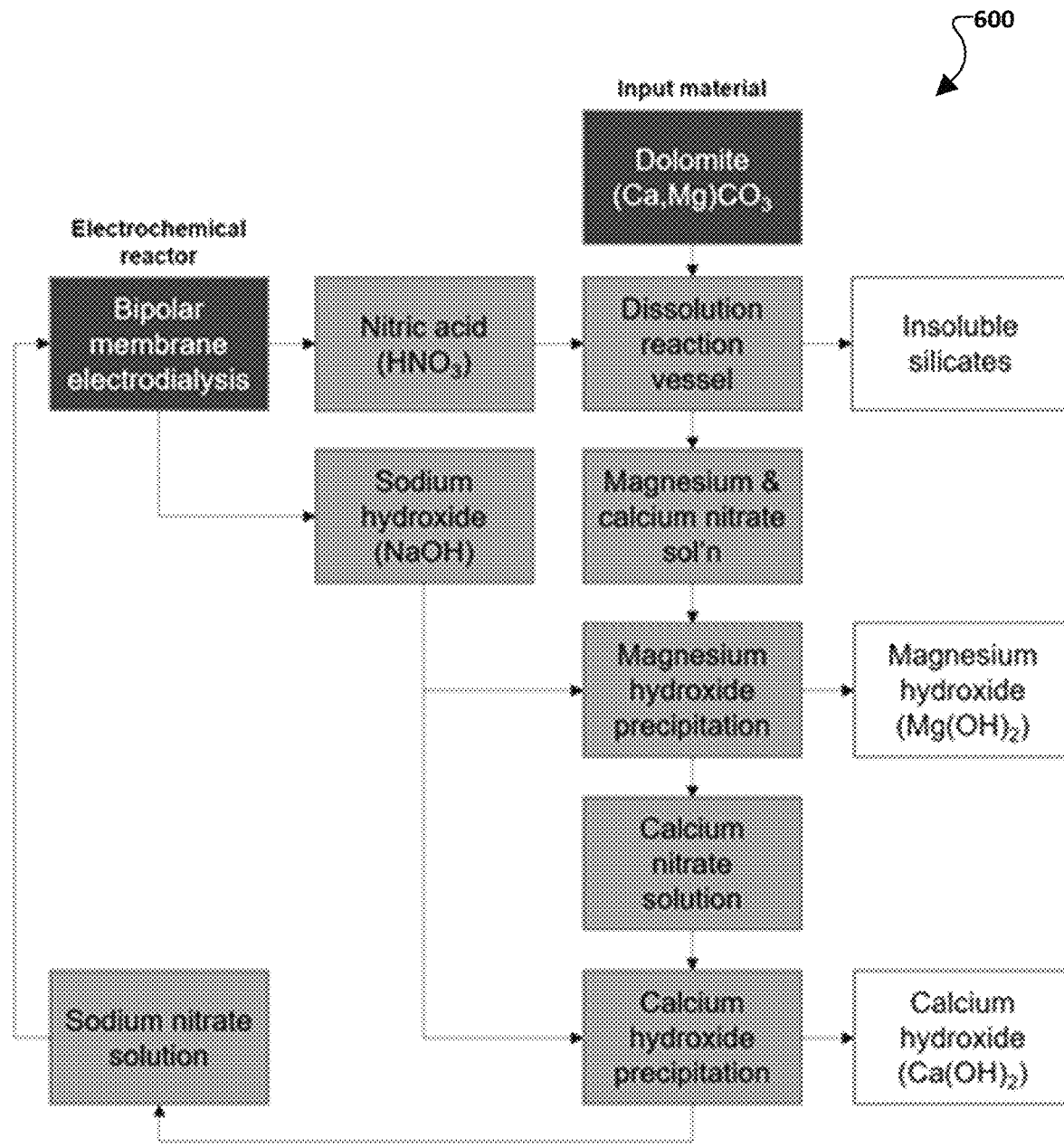
Figure 7:
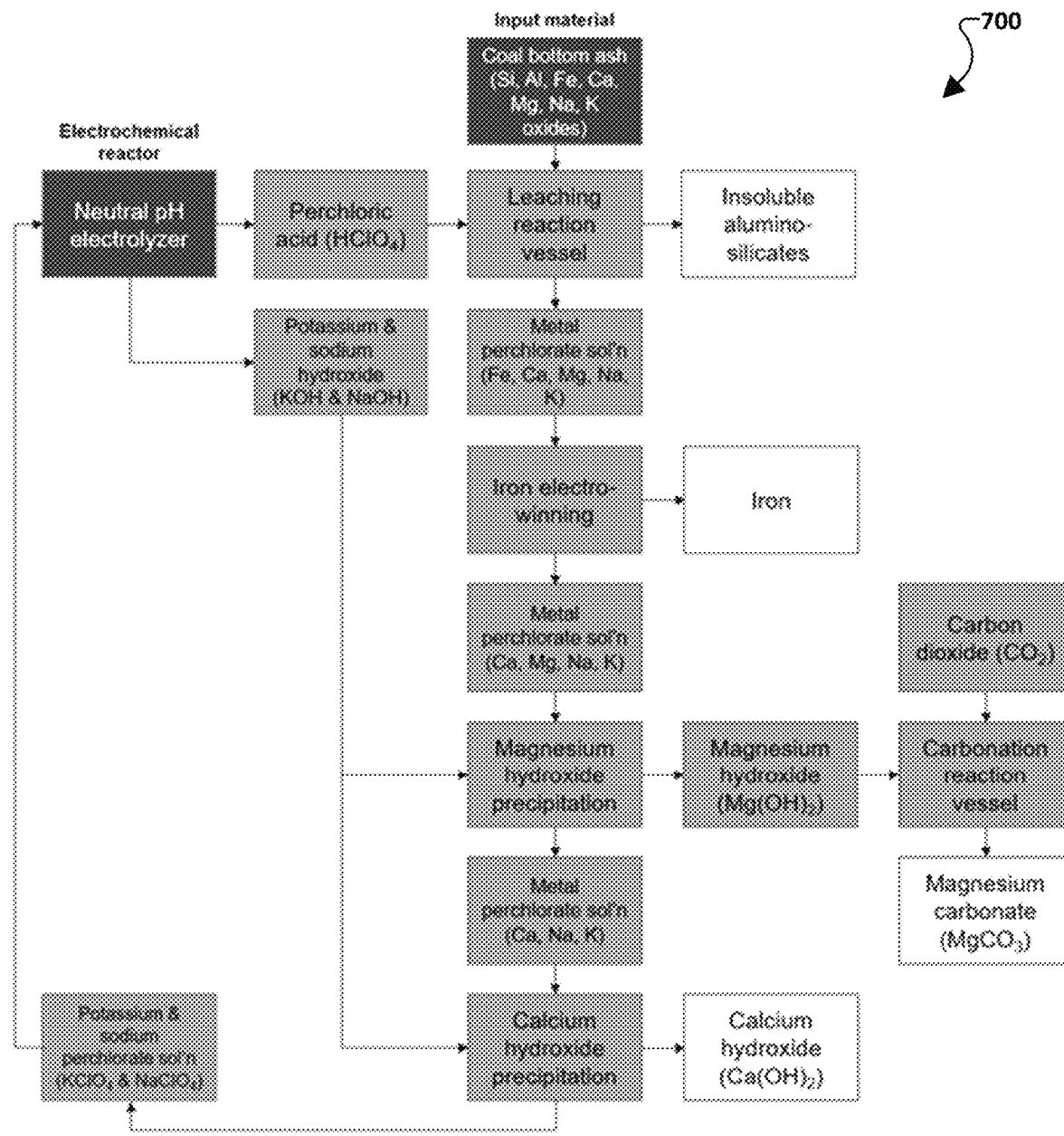

FIGS. 5-7 illustrate example processes in accordance with various embodiments for processing material inputs using an electrochemical reactor.

FIG. 5 illustrates an example process 500 in which the input material is olivine and the electrochemical reactor is a chloralkali reactor. The chloralkali reactor produces sodium hydroxide, which is reacted with carbon dioxide to create sodium bicarbonate. This process captures and sequesters carbon dioxide, preventing its release into the atmosphere or removing it from the atmosphere, and therefore may be useful for combating global climate change. The chloralkali reactor also produces hydrogen and chlorine gases, which are reacted in an acid burner to create hydrochloric acid. The hydrochloric acid is used to leach the magnesium and iron out of the olivine input material, leaving behind insoluble silicates. These silicates may have a disordered or amorphous crystal structure, a high specific surface area, and a high purity, making them valuable for multiple applications. The silicates may be used as supplementary cementitious materials or as components of pozzolanic cement. Iron electrowinning is performed on the magnesium and iron chloride solution to recover metallic iron. Finally, the remaining magnesium chloride solution is used as an input into the Dow process for the production of metallic magnesium.

FIG. 6 illustrates an example process 600 in which the input material is dolomite and the electrochemical reactor is a bipolar membrane electrodialysis unit. The bipolar membrane electrodialysis unit takes an input of sodium nitrate salt solution, and produces nitric acid and sodium hydroxide. The nitric acid is used to dissolve the input material, dolomite, which primarily consists of soluble calcium and magnesium carbonate, but may also contain some insoluble silicate impurities. The insoluble silicates produced by this system may have a disordered or amorphous crystal structure, a high specific surface area, and a high purity, making them valuable for multiple applications. The silicates may be used as supplementary cementitious materials or as components of pozzolanic cement. The magnesium and calcium nitrate solution is reacted with the base to first precipitate magnesium hydroxide, which has lower solubility and therefore precipitates at lower pH than calcium hydroxide, then via the addition of more NaOH, precipitate calcium hydroxide at a higher pH. The magnesium hydroxide may be used in cement, for magnesium metal production, or for other applications. The calcium hydroxide may be used as a component of pozzolanic cement or for other applications. The remaining sodium nitrate solution is recycled to the bipolar membrane electrodialysis unit.

FIG. 7 illustrates an example process 700 in which the input material is coal bottom ash, and the electrochemical reactor is a neutral pH electrolyzer. The neutral pH electrolyzer unit takes an input of a solution containing potassium perchlorate and sodium perchlorate, and produces perchloric acid and a mixed sodium hydroxide/potassium hydroxide solution. The acid is used to leach soluble elements from the input material, coal bottom ash, including iron, calcium, magnesium, sodium, and potassium. The insoluble aluminosilicates recovered from the leaching process may have a disordered or amorphous crystal structure, a high specific surface area, and a high purity, making them valuable for multiple applications. The aluminosilicates may be used as supplementary cementitious materials or as components of pozzolanic cement. Iron electrowinning is employed to recover iron metal from the mixed metal perchlorate solution. Then the remaining mixed metal perchlorate solution is reacted with the base to first precipitate magnesium hydroxide, which has lower solubility and therefore precipitates at lower pH than calcium hydroxide, then via the addition of more KOH/NaOH, precipitate calcium hydroxide at a higher pH. The magnesium hydroxide is then reacted with carbon dioxide to create magnesium carbonate. This process captures and sequesters carbon dioxide, preventing its release into the atmosphere or removing it from the atmosphere, and therefore may be useful for combating global climate change. The calcium hydroxide may be used as a component of pozzolanic cement or for other applications. The remaining solution of sodium perchlorate and potassium perchlorate is recycled to the neutral pH electrolyzer The discussions of example processes 500, 600, and 700 are merely examples of various embodiments, and in various embodiments combinations of subsystems may be used in addition to those discussed in the above examples 500, 600, and 700. As examples, many combinations of the subsystems described earlier may be assembled to meet desired purposes, depending on the nature of the input material, the desired product or products, and variations in the input material or demand for the products over time.

Various embodiments also include methods of operating the system to meet particular efficiency and cost objectives, or market demands. A combination of subsystems provides for greater flexibility of operation. In some embodiments, subsystems within the system may be operated intermittently or selectively. As a non-limiting example, a system may have the capability of producing both magnesium metal and magnesium carbonate, and may produce more of one or the other as market demand or pricing for each varies. As another example, when there is an imbalance in the consumption of acid and base from the electrochemical reactor, such as when an excess of acid is consumed in dissolving metals for electrowinning, a resulting excess of sodium hydroxide may be beneficially used to sequester $CO_2$ through sodium carbonate formation. As another example, a system may accept different input materials, such as either limestone or dolomite, with the magnesium handling subsystems being used only when dolomite is the input material.

A key feature of various embodiments may be the unique combination of the electrochemical reactor with various additional processing steps to produce multiple useful products. The integration of the various component subsystems into a full system may enable the complete utilization of the input materials and the production of many valuable outputs.

Human civilization requires materials manufacturing and processing. Many materials manufacturing and processing operations result in carbon dioxide ($CO_2$) emissions to the atmosphere, but $CO_2$ emissions must be drastically reduced because they contribute to global climate change. The systems of the various embodiments may decrease $CO_2$ emissions compared to conventional manufacturing approaches. The systems of the various embodiments may be low carbon, carbon neutral, or carbon negative. In some embodiments, these systems may be used to prevent $CO_2$ emissions and/or capture $CO_2$ from the atmosphere.

The systems of this invention may enable the use of new feedstocks for materials manufacturing and processing. In some embodiments, the systems of this invention may enable the use of low-value minerals which are abundant but not widely used. In some embodiments the input materials may be difficult to process or refine using existing technologies. In some embodiments, the systems of this invention may enable the use of waste products such as coal ash or municipal solid waste incinerator ash for the creation of valuable materials. In some embodiments this may prevent disposal of the input materials in landfills, ponds, or other storage areas. In some embodiments, the systems of this invention may prevent or remediate environmental damage caused by leaching of harmful chemicals out of materials into the environment. In some embodiments, the systems of this invention may produce products which are highly valuable for certain applications due to their physical or chemical properties. For example, some systems described herein may create high surface area, disordered, high purity silica. These properties may make this silica material highly reactive and valuable as a supplementary cementitious material or as a component of pozzolanic cement. As an additional example, some systems described herein may create high purity magnesium chloride, which is valuable as a feedstock for the production of magnesium metal In various embodiments, carbon dioxide may be mineralized while simultaneously a silicate is at least partially dissolved and subsequently precipitated in order to perform an operation, including to produce a product. In various embodiments, a process or method may be conducted whereby a reactant comprising sodium hydroxide is reacted with a silicate, forming a mixture in which said silicate is at least partially dissolved. In various embodiments, simultaneously or subsequently, carbon dioxide may be reacted with said mixture, causing precipitation of a silicate (including but not limited to silica, $SiO_2$). In some embodiments, the starting siliceous solid and/or precipitated siliceous product may comprise sodium silicates, aluminum silicates, iron silicates, or calcium silicates. In various embodiments, simultaneously or subsequently, carbon dioxide may be captured and sequestered by the formation of solid or dissolved sodium carbonate.

Without being bound by any particular scientific interpretation, a reaction occurring during the process or method conducted whereby a reactant comprising sodium hydroxide is reacted with a silicate, forming a mixture in which said silicate is at least partially dissolved may for example be:

2NaOH+SiO$_2$ (in starting siliceous solid)+CO$_2$ (gas)→Na$_2$CO$_3$ (solid or dissolved)+SiO$_2$ (precipitated)+H$_2$O                     (I).

Alternatively, a sodium silicate may be dissolved in aqueous solution partially with or even without the use of NaOH, and upon reaction with $CO_2$ (gas) may form sodium carbonate and precipitated silicate as in the above reaction. Notice that in this embodiment, neither an acid nor a base may be required in order to carry out said reactions. In other embodiments herein described, the acids and bases, where used, may also be produced by non-electrolytic means.

The starting metal hydroxide and resulting metal carbonate may vary from this example and may include at least Ca, Mg, Na, and K as the metal.

Figure 8:
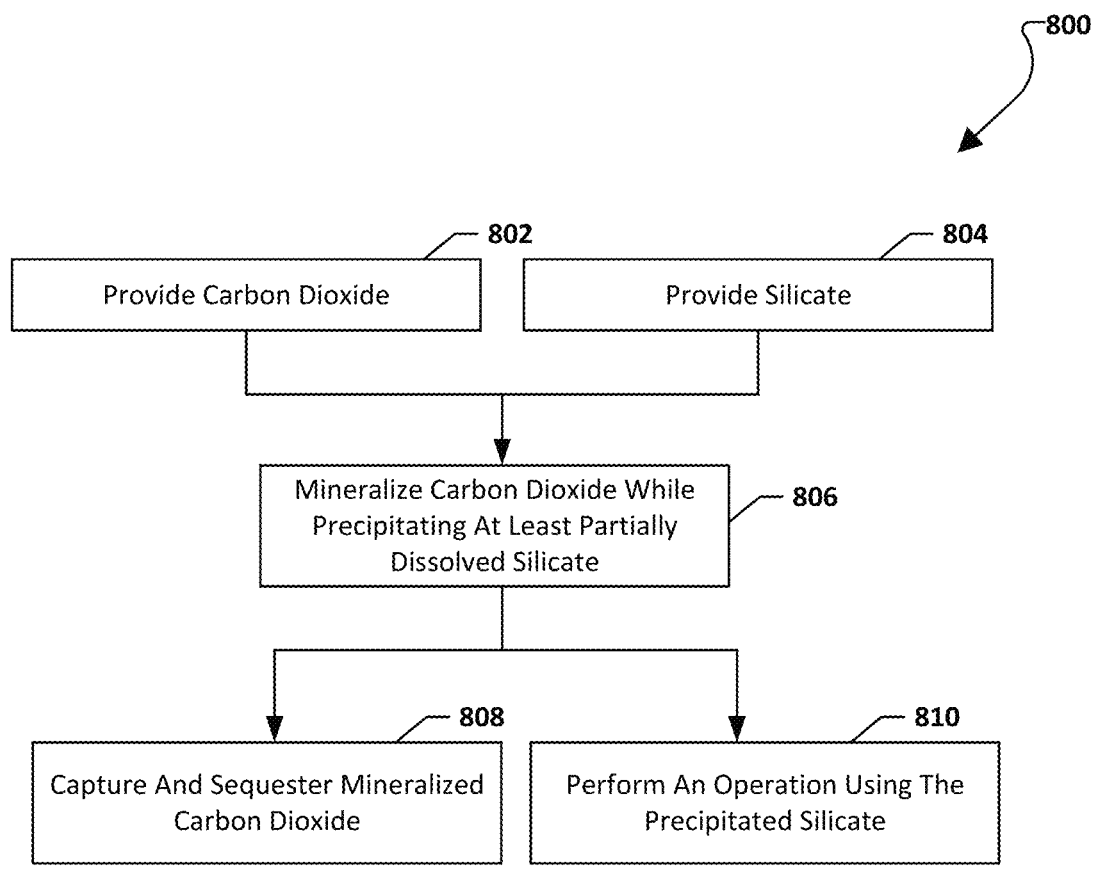
FIG. 8 is a process flow diagram illustrating an embodiment method for mineralizing carbon dioxide at least partially dissolving a silicate in accordance with various embodiments.

FIG. 8 is a process flow diagram illustrating an embodiment method 800 for mineralizing carbon dioxide at least partially dissolving a silicate in accordance with various embodiments. In step 802, a carbon dioxide may be provided. In step 804, a silicate may be provided. In various embodiments, providing a silicate may include reacting sodium hydroxide with a silicate, forming a mixture in which said silicate is at least partially dissolved. The carbon dioxide and silicate may be provided sequentially or simultaneously.

In step 806, carbon dioxide may be mineralized while an at least partially dissolved silicate is precipitated. In various embodiments, simultaneously or subsequently, carbon dioxide may be reacted with the mixture in which the silicate is at least partially dissolved, causing precipitation of a silicate (including but not limited to silica, $SiO_2$).

In step 808 the mineralized carbon dioxide may be captured and sequestered and in step 810 an operation may be performed using the precipitated silicate. The steps 808 and 810 may be performed simultaneously or sequentially.

Various embodiments may include additional reaction steps beyond those illustrated in FIG. 8. In some embodiments, the process may start by converting a salt, such as sodium chloride, to an acid and a base, such as hydrochloric acid and sodium hydroxide. In some embodiments, the conversion of salt to acid and base may occur in an electrochemical reactor, such as a chlor-alkali reactor, neutral pH electrolyzer, salt splitting cell, or bipolar membrane electrodialysis reactor. For example, the electrochemical reactor may be any electrochemical reactor discussed above, such as those discussed with reference to FIGS. 1-8. In some embodiments, an acid, such as hydrochloric acid, may be used to leach or dissolve calcium and magnesium ions out of an input material, which may be the same as the starting siliceous solid, or may be a different input material. In some embodiments, a sodium or potassium carbonate may react with calcium or magnesium ions in aqueous solution to form magnesium or calcium carbonate and regenerate a sodium or potassium salt.

In one example of aspects of the various embodiments, the following set of reactions may occur:

$$NaCl\ (s) + H_2O\ (l) \rightarrow NaOH\ (aq) + HCl\ (aq);$$

$$HCl\ (aq) + coal\ ash\ (contains\ SiO_2,\ CaO,\ MgO)\ (s) \rightarrow SiO_2\ (impure\ siliceous\ solid) + CaCl_2\ (aq) + MgCl_2\ (aq);$$

$$2\ NaOH + SiO_2\ (in\ impure\ siliceous\ solid) + CO_2\ (gas) \rightarrow Na_2CO_3\ (solid\ or\ dissolved) + SiO_2\ (precipitated) + H_2O\ (l);\ and$$

$$2\ Na_2CO_3\ (s\ or\ aq) + MgCl_2\ (aq) + CaCl_2)\ (aq) \rightarrow 4\ NaCl\ (aq) + MgCO_3\ (precipitated) + CaCO_3\ (precipitated).$$

In this example embodiment, the NaCl may be recycled to the first step to generate additional NaOH and HCl.

Silicates produced by the various embodiments may include useful products. For example, useful products may be produced as part of step 810 to perform an operation using the precipitated silicate. According to at least some embodiments, said precipitated silicates, or partially reacted and precipitated silicates, may be used as construction materials or constituents of construction materials. Said construction materials may include cement, cementitious materials, cement paste, mortar, concrete, supplementary cementitious materials, fillers, aggregate, plasters, stuccos, grouts, whitewashes, bricks, boards, shotcrete/gunite, and the like. In various embodiments, the input materials may include constituents which are used to produce said construction materials including, but not limited to, calcium silicates, wollastonite, coal ash, fly ash, bottom ash, ponded ash, incinerator ash, economizer ash, slags, clays, kaolins, metakaolin, pumice, pozzolans, mafic rocks, and/or ultramafic rocks.

Without being bound by any particular scientific interpretation, in some embodiments, processing silicates by dissolution and reprecipitation may transform low-quality and/or low-value silicates into higher value, higher quality, and/or more useful silicates. In some embodiments, the precipitated silicate product may have certain physical or chemical properties that are advantageous for certain applications. These properties may include: average particle size, particle size distribution, morphology, crystallinity, porosity, specific surface area, aspect ratio, and/or purity. By producing a silicate with controlled physical and chemical properties, the precipitates may be useful as supplementary cementitious materials with selected pozzolanic reactivity and/or water demand, such as optimized pozzolanic reactivity and/or water demand, pozzolanic reactivity and water demand. The precipitated silicates may be used as supplementary cementitious materials or pozzolans in cement, concrete, or similar building materials (e.g., cement paste, mortar, concrete, supplementary cementitious materials, fillers, aggregate, plasters, stuccos, grouts, whitewashes, bricks, boards, shotcrete/gunite, etc.), where the precipitated silicates will react with calcium hydroxide to form calcium silicate hydrate, a phase that may give hardened cement or concrete its compressive strength. Optimized reactivity may mean that the precipitates would react more rapidly and completely with calcium hydroxide to form calcium silicate hydrate, therefore resulting in quicker setting or faster hardening cement or concrete. The precipitated silicates may also be optimized for water demand, meaning that the precipitated silicates may require less water to be added to produce a cement paste, mortar, concrete, or similar product that is sufficiently flowable or pumpable to be cast, poured, or otherwise deployed in a construction application. Lower water demand means that a smaller amount of water could be added to the cement or concrete, which may result in higher strength or shorter setting time.

In some embodiments the starting siliceous solid may be partially dissolved; in other embodiments, it may be completely dissolved. In some embodiments the surface of the starting siliceous solid may be coated with a precipitated silicate. In other embodiments, the precipitated silicate may be in the form of a discrete, separate phase. In some embodiments, the reactivity of said siliceous solid when used as a component in said construction material may be increased, as measured by methods performed on the siliceous solid or the construction material including, but not limited to, calorimetry, thermogravimetric analysis, surface area measurement, porosimetry, diffraction, microscopy, mechanical strength measurements, measurement of setting times, and/or measurement of strength development times. Various embodiments may also include one or more additional operations or processes, including the processes of mixing the starting materials, incorporating carbon dioxide, carrying out one or more of the reactions forming the carbonate, dissolving the silicate, precipitating the silicate, precipitating the metal carbonate, separating one or more precipitates from each other or from the reaction solution, collecting a precipitate, drying a precipitate, grinding or comminuting a precipitate, and/or purifying liquid solutions used in the process or processes.

Various embodiments may also include an apparatus configured to mineralize carbon dioxide while simultaneously a silicate is at least partially dissolved and subsequently precipitated in order to perform an operation, including to produce a product. The apparatus may include a reactor or sequence of reactors that individually or collectively carry out the processes of mixing the starting materials, incorporating carbon dioxide, carrying out one or more of the reactions forming the carbonate, dissolving the silicate, precipitating the silicate, precipitating the metal carbonate, separating one or more precipitates from each other or from the reaction solution, collecting a precipitate, drying a precipitate, grinding or comminuting a precipitate, and/or purifying liquid solutions used in the process or processes. For example, the apparatus may include any of the reactors or other devices discussed above, such as those discussed with reference to FIGS. 1-8.

Various embodiments may also include a system including one or more apparatuses configured to mineralize carbon dioxide while simultaneously a silicate is at least partially dissolved and subsequently precipitated in order to perform an operation, including to produce a product. The system may include a source of renewable energy providing at least a portion of the power that operates the system or the apparatus. For example, the system may include any of the reactors or other devices discussed above, such as those discussed with reference to FIGS. 1-8. In some embodiments the renewable energy is renewable electricity, including but not limited to renewable electricity from wind and solar generators. The system may include subsystems for purifying brine or water used in the process or processes, and may include the reuse of said brine or water. The system may include apparatus or plants or subsystems to use the output of the apparatus or subsystems for the purpose of producing said construction materials.

Figure 9:
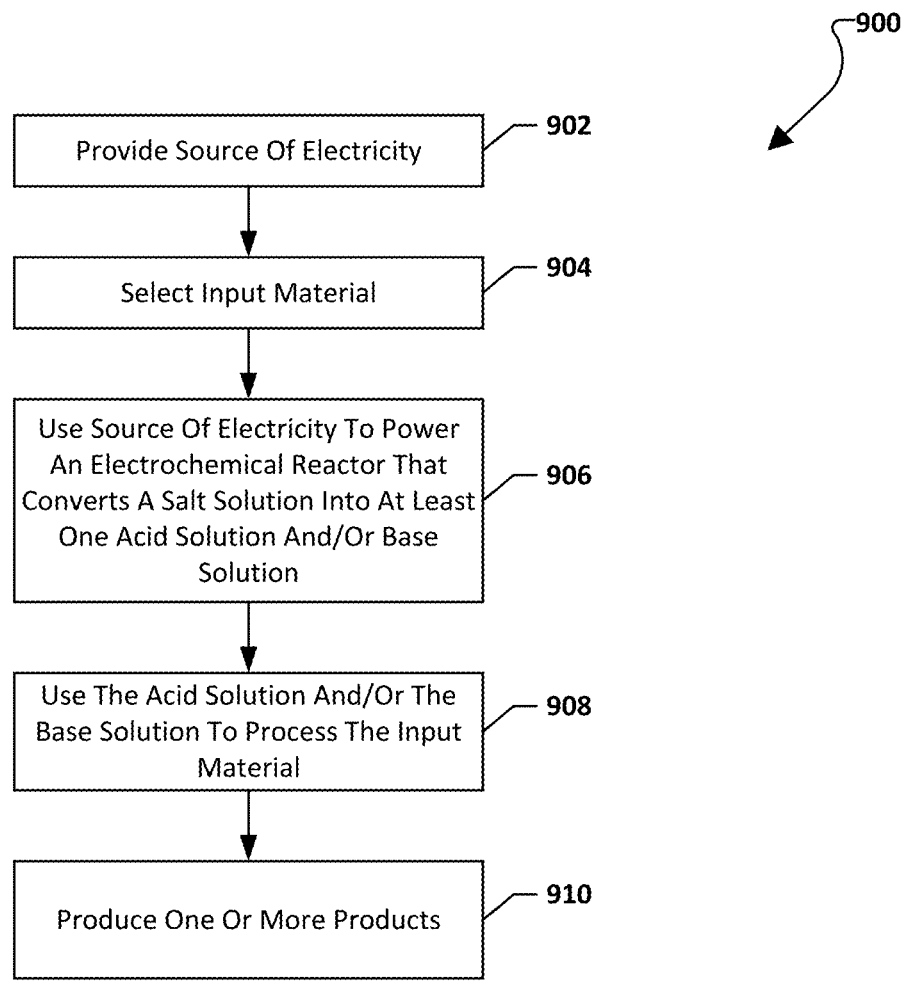
FIG. 9 is a process flow diagram illustrating an embodiment method for processing an input material and/or producing one or more products in accordance with various embodiments.

FIG. 9 is a process flow diagram illustrating an embodiment method 900 for processing an input material and/or producing one or more products in accordance with various embodiments. In various embodiments, the steps of method 900 may be performed by one or more of the systems and/or devices described above, for example the systems and apparatuses described with reference to FIGS. 1-8. For example, a system for performing the method 900 may include: a source of electricity; an electrochemical reactor powered by the source of electricity; chemical, mechanical, electrical, and/or electrochemical process equipment for handling and/or introducing one or more input materials; chemical, mechanical, electrical, and/or electrochemical process equipment used to react the one or more input materials with one or more solutions produced by the electrochemical reactor (e.g., an acid solution and/or a base solution); and chemical, mechanical, electrical, and/or electrochemical process equipment for collecting and/or outputting one or more products.

In step 902, one or more sources of electricity may be provided. For example, the one or more sources of electricity may be any source of electricity described above, singularly or in any combination. As specific examples, the source of electricity may at least in part be a renewable source of electricity. As a specific example, the source of electricity may include at least 20% renewable sources, including without limitation solar, wind, hydroelectric, geothermal, or nuclear electricity generation facilities. As a specific example, the source of electricity may include at least 40% renewable sources, including without limitation solar, wind, hydroelectric, geothermal, or nuclear electricity generation facilities. As a specific example, the source of electricity may include at least 60% renewable sources, including without limitation solar, wind, hydroelectric, geothermal, or nuclear electricity generation facilities. As a specific example, the source of electricity may include at least 80% renewable sources, including without limitation solar, wind, hydroelectric, geothermal, or nuclear electricity generation facilities. As a specific example, the source of electricity may include at least 90% renewable sources, including without limitation solar, wind, hydroelectric, geothermal, or nuclear electricity generation facilities.

In step 904, one or more input materials may be selected. For example, the one or more input materials may be any input material described above, singularly or in any combination. As an example, the input material may include at least 20% by weight inorganic compounds. As an example, the input material may include at least 40% by weight inorganic compounds. As an example, the input material may include at least 60% by weight inorganic compounds. As an example, the input material may include at least 80% by weight inorganic compounds. As an example, the input material may include at least 90% by weight inorganic compounds. As an example, the input material may include an industrial waste byproduct material. As an example, the input material may include coal ash. As an example, the input material may include ponded or landfilled coal ash. As an example, the input material may include coal bottom ash. As an example, the input material may include municipal waste incinerator ash. As an example, the input material may include recycled or waste construction materials such as crushed concrete. As an example, the input material may include limestone and/or dolomite. As an example, the input material may include mafic and/or ultramafic rock. As an example, the input material may include olivine. As an example, the input material may include basalt. As an example, the input material may include wollastonite. As an example, the input material may include lime kiln dust. As an example, the input material may include cement kiln dust.

As an example, the input material may be a solid. As an example, the input material may include greater than about 30% $SiO_2$ as a mass percentage of the input material. As an example, the input material may include greater than about 50% $SiO_2$ as a mass percentage of the input material. As an example, the input material may include greater than about 70% $SiO_2$ as a mass percentage of the input material. As an example, the input material may include greater than about 90% $SiO_2$ as a mass percentage of the input material. As an example, the input material may include greater than about 2% CaO as a mass percentage of the input material. As an example, the input material may include greater than about 5% CaO as a mass percentage of the input material. As an example, the input material may include greater than about 10% CaO as a mass percentage of the input material. As an example, the input material may include greater than about 20% CaO as a mass percentage of the input material. As an example, the input material may include greater than about 40% CaO as a mass percentage of the input material.

As an example, the input material may include greater than about 2% MgO as a mass percentage of the input material. As an example, the input material may include greater than about 5% MgO as a mass percentage of the input material. As an example, the input material may include greater than about 10% MgO as a mass percentage of the input material. As an example, the input material may include greater than about 20% MgO as a mass percentage of the input material. As an example, the input material may include greater than about 40% MgO as a mass percentage of the input material. As an example, the input material may include greater than about 2% $Al_2O_3$ as a mass percentage of the input material. As an example, the input material may include greater than about 5% $Al_2O_3$ as a mass percentage of the input material. As an example, the input material may include greater than about 10% $Al_2O_3$ as a mass percentage of the input material. As an example, the input material may include greater than about 20% $Al_2O_3$ as a mass percentage of the input material. As an example, the input material may include greater than about 40% $Al_2O_3$ as a mass percentage of the input material. As an example, the input material may include greater than about 60% $Al_2O_3$ as a mass percentage of the input material. As an example, the input material may include greater than about 80% $Al_2O_3$ as a mass percentage of the input material. As an example, the input material may include greater than about 2% $Fe_2O_3$ as a mass percentage of the input material. As an example, the input material may include greater than about 5% $Fe_2O_3$ as a mass percentage of the input material. As an example, the input material may include greater than about 10% $Fe_2O_3$ as a mass percentage of the input material. As an example, the input material may include greater than about 20% $Fe_2O_3$ as a mass percentage of the input material. As an example, the input material may include greater than about 40% $Fe_2O_3$ as a mass percentage of the input material.

In step 906, the one or more sources of electricity may be used to power one or more electrochemical reactors that convert a salt solution (e.g., a brine, etc.) into at least one acid solution and/or one base solution. For example, the one or more electrochemical reactors may be any electrochemical reactor described above, singularly or in any combination. As an example, the electrochemical reactor may be an electrolytic reactor. As an example, the electrochemical reactor may be an electrodialysis reactor. As an example, the electrochemical reactor may be a chlor-alkali electrolyzer. As an example, the electrochemical reactor may be a neutral pH electrolyzer. As an example, the electrochemical reactor may be a salt splitting electrolyzer. As an example, the electrochemical reactor may be a bipolar membrane electrodialysis reactor. As an example, the electrochemical reactor may be a two-compartment bipolar membrane electrodialysis reactor. As an example, the electrochemical reactor may be a three-compartment bipolar membrane electrodialysis reactor. As an example, the electrochemical reactor may be an electrolytic reactor that does not contain an ion exchange membrane. As an example, the electrochemical reactor may be an electrolytic reactor that does not contain an ion exchange membrane, diaphragm, porous separator, or any other membrane or porous material between the anode and cathode. As an example, the electrochemical reactor may accept an input salt solution comprising sodium chloride. As an example, the electrochemical reactor may accept an input salt solution comprising sodium nitrate. As an example, the electrochemical reactor may accept an input salt solution comprising sodium perchlorate. As an example, the electrochemical reactor may accept an input salt solution comprising a mixture containing at least 5% mass of two or more sodium salts. As an example, the electrochemical reactor may accept an input salt solution comprising potassium chloride, potassium nitrate, or potassium perchlorate. As an example, the electrochemical reactor may accept an input salt solution comprising ammonium chloride, ammonium nitrate, or ammonium perchlorate. As an example, the electrochemical reactor may produce an acid solution comprising hydrochloric acid. As an example, the electrochemical reactor may produce an acid solution comprising nitric acid. As an example, the electrochemical reactor may produce an acid solution comprising perchloric acid. As an example, the electrochemical reactor may produce an acid solution comprising a mixture containing at least 0.5% mass of two or more acids from the group including hydrochloric acid, nitric acid, and perchloric acid. As an example, the electrochemical reactor may produce a base solution comprising sodium hydroxide. As an example, the electrochemical reactor may produce a base solution comprising potassium hydroxide. As an example, the electrochemical reactor may produce a base solution comprising ammonium hydroxide. As an example, the electrochemical reactor may be a chlor-alkali electrolyzer that produces a sodium hydroxide solution, hydrogen gas, and chlorine gas. As a specific example, the hydrogen gas and chlorine gas produced by the chlor-alkali electrolyzer may be reacted to produce hydrochloric acid. As a specific example, the hydrogen gas and chlorine gas produced by the chlor-alkali electrolyzer may be reacted to produce hydrochloric acid in an acid burner. As a specific example, the hydrogen gas and chlorine gas produced by the chlor-alkali electrolyzer may be reacted to produce hydrochloric acid in a hydrogen/chlorine fuel cell.

In step 908, the acid solution and/or the base solution may be used to process the one or more input materials. For example, the acid solution and/or the base solution may be used to process input materials in any manner as described above. As an example, the acid and/or base produced by the electrochemical reactor may be used to leach and/or dissolve components of the input materials. As an example, the acid and/or base produced by the electrochemical reactor may be used to leach and/or dissolve calcium from an input material. As an example, the acid and/or base produced by the electrochemical reactor may be used to leach and/or dissolve magnesium from an input material. As an example, the acid and/or base produced by the electrochemical reactor may be used to leach and/or dissolve at least one transition metal from an input material. As an example, the acid and/or base produced by the electrochemical reactor may be used to leach and/or dissolve silicon or silica from an input material. As an example, the acid and/or base produced by the electrochemical reactor may be used to leach and/or dissolve aluminum or alumina from an input material. As an example, the acid and/or base produced by the electrochemical reactor may be used to leach and/or dissolve iron from an input material. As an example, the acid and/or base produced by the electrochemical reactor may be used to leach and/or dissolve copper from an input material. As an example, the acid and/or base produced by the electrochemical reactor may be used to leach and/or dissolve zinc from an input material. As an example, the acid and/or base produced by the electrochemical reactor may be used to leach and/or dissolve potassium from an input material. As an example, the acid and/or base produced by the electrochemical reactor may be used to leach and/or dissolve sodium from an input material. As an example, an acid solution produced by the electrochemical reactor may be used to leach and/or dissolve calcium from an input material. As an example, an acid solution produced by the electrochemical reactor may be used to leach and/or dissolve magnesium from an input material. As an example, an acid solution produced by the electrochemical reactor may be used to leach and/or dissolve at least one transition metal from an input material. As an example, an acid solution produced by the electrochemical reactor may be used to leach and/or dissolve silicon or silica from an input material. As an example, an acid solution produced by the electrochemical reactor may be used to leach and/or dissolve aluminum or alumina from an input material. As an example, an acid solution produced by the electrochemical reactor may be used to leach and/or dissolve iron from an input material. As an example, an acid solution produced by the electrochemical reactor may be used to leach and/or dissolve copper from an input material. As an example, an acid solution produced by the electrochemical reactor may be used to leach and/or dissolve zinc from an input material. As an example, an acid solution produced by the electrochemical reactor may be used to leach and/or dissolve potassium from an input material. As an example, an acid solution produced by the electrochemical reactor may be used to leach and/or dissolve potassium from an input material. As an example, an acid solution produced by the electrochemical reactor may be used to leach and/or dissolve sodium from an input material. As an example, an acid solution produced by the electrochemical reactor may be used to leach and/or dissolve calcium, magnesium, and/or transition metals from an input material, leaving behind insoluble solids comprising alumina and/or silica. As an example, an acid solution produced by the electrochemical reactor may be used to leach and/or dissolve calcium, magnesium, and/or transition metals from an input material, while simultaneously comminuting insoluble solids comprising alumina and/or silica. As an example, an acid solution produced by the electrochemical reactor may be used to leach and/or dissolve calcium, magnesium, and/or transition metals from an input material, leaving behind insoluble solids comprising alumina and/or silica with mean major particle diameter smaller than the mean major particle diameter of the input material. As an example, an acid and/or a base produced by the electrochemical reactor may be reacted with a dissolved component of the input material to precipitate a solid material. As an example, an acid and/or a base produced by the electrochemical reactor may be reacted with dissolved calcium ions leached from the input material to precipitate calcium hydroxide. As an example, an acid and/or a base produced by the electrochemical reactor may be reacted with dissolved magnesium ions leached from the input material to precipitate magnesium hydroxide. As an example, a base produced by the electrochemical reactor may be reacted with dissolved calcium ions leached from the input material to precipitate calcium hydroxide. As an example, a base produced by the electrochemical reactor may be reacted with dissolved magnesium ions leached from the input material to precipitate magnesium hydroxide.

In various embodiments, the operations at step 908 may result in the regeneration of a salt solution, which may be recycled to the electrochemical reactor. In various embodiments, the operations at step 908 may further include purification of the acid solution, the base solution, and/or the salt solution. As an example, an acid, base, or salt solution may be purified to remove solid particles, dissolved species, and/or dissolved ions. As an example, a salt solution may be purified to remove solid particles, dissolved species, and/or dissolved ions. As an example, a salt solution may be purified using an ion exchange process to remove dissolved ions. As an example, a salt solution may be purified using a filtration process to remove solid particles. As an example, a salt solution may be purified using an electrowinning process to remove dissolved metals.

In step 910, one or more products may be produced, for example from one or more materials resulting from the processing of the input materials in step 908. For example, the one or more products produced may be any product produced from input materials discussed above. As examples, the products produced by the process may include an acid solution, a hydrochloric acid solution, a nitric acid solution, a perchloric acid solution, a base solution, a sodium hydroxide solution, a potassium hydroxide solution, an ammonium hydroxide solution, a silicate material, and/or an aluminosilicate material. As an example, the one or more products produced may be a silicate or aluminosilicate material with an amorphous fraction greater than about 50%. As an example, the one or more products produced may be a silicate or aluminosilicate material with a median particle size less than about 100 micrometers. As an example, the one or more products produced may be a silicate or aluminosilicate material with a median particle size less than about 50 micrometers. As an example, the one or more products produced may be a silicate or aluminosilicate material with a median particle size less than about 50 micrometers. As an example, the one or more products produced may include a pozzolanic material. As an example, the one or more products produced may include a supplementary cementitious material. As an example, the one or more products produced may include a cementitious binder. As an example, the one or more products produced may include a pozzolanic cement. As an example, the one or more products produced may include a metal. As an example, the one or more products produced may include a calcium metal. As an example, the one or more products produced may include a magnesium metal. As an example, the one or more products produced may include an iron metal. As an example, the one or more products produced may include a copper metal. As an example, the one or more products produced may include a zinc metal. As an example, the one or more products produced may include a cobalt metal. As an example, the one or more products produced may include an aluminum metal. As an example, the one or more products produced may include a chromium metal. As an example, the one or more products produced may include a copper metal. As an example, the one or more products produced may include a metal hydroxide. As an example, the one or more products produced may include calcium hydroxide. As an example, the one or more products produced may include magnesium hydroxide. As an example, the one or more products produced may include sodium hydroxide. As an example, the one or more products produced may include potassium hydroxide. As an example, the one or more products produced may include ammonium hydroxide. As an example, the one or more products produced may include a metal carbonate. As an example, the one or more products produced may include calcium carbonate. As an example, the one or more products produced may include magnesium carbonate. As an example, the one or more products produced may include sodium carbonate. As an example, the one or more products produced may include potassium carbonate. As an example, the one or more products produced may include ammonium carbonate. As an example, the one or more products produced may include sodium bicarbonate. As an example, the one or more products produced may include potassium bicarbonate. As an example, the one or more products produced may include ammonium bicarbonate. As an example, the one or more products produced may include a metal salt. As an example, the one or more products produced may include calcium chloride. As an example, the one or more products produced may include magnesium chloride. As an example, the one or more products produced may include iron chloride. As an example, the one or more products produced may include zinc chloride. As an example, the one or more products produced may include copper chloride. As an example, the one or more products produced may include titanium chloride. As an example, the one or more products produced may include calcium nitrate. As an example, the one or more products produced may include magnesium nitrate. As an example, the one or more products produced may include calcium perchlorate. As an example, the one or more products produced may include magnesium perchlorate.

In various embodiments, step 910 may further include producing a carbonate or bicarbonate product. For example, step 910 may include performing one or more steps of method 800 described above. As an example, a carbonate or bicarbonate product may be produced using $CO_2$ from a fossil fuel combustion flue gas stream. As an example, a carbonate or bicarbonate product may be produced using $CO_2$ from the decomposition of a magnesium carbonate, calcium carbonate, and/or magnesium-calcium carbonate. As an example, a carbonate or bicarbonate product may be produced using direct air-captured $CO_2$. For example, step 910 may include performing operations such that a carbonate or bicarbonate product is produced, a silicate or aluminosilicate is at least partially dissolved, and a silicate or aluminosilicate is precipitated. As a specific example, the precipitated silicate or aluminosilicate material may be a supplementary cementitious material. As a specific example, the precipitated silicate or aluminosilicate material may have optimized reactivity and water demand. As a specific example, the precipitated silicate or aluminosilicate material may have a paste consistency water demand of less than 0.4. As a specific example, the precipitated silicate or aluminosilicate material may have a paste consistency water demand of less than 0.5. As a specific example, the precipitated silicate or aluminosilicate material may have a paste consistency water demand of less than 0.6. As a specific example, the precipitated silicate or aluminosilicate material may have a mini-slump cone water demand of less than 0.4. As a specific example, the precipitated silicate or aluminosilicate material may have a mini-slump cone water demand of less than 0.5. As a specific example, the precipitated silicate or aluminosilicate material may have a mini-slump cone water demand of less than 0.6. As a specific example, the precipitated silicate or aluminosilicate material may have a heat release of greater than about 200 J/g aluminosilicate, 300 J/g aluminosilicate, 400 J/g aluminosilicate, 500 J/g aluminosilicate, 600 J/g aluminosilicate, or 700 J/g aluminosilicate when tested using the isothermal calorimetry pozzolanic reactivity test method described in Suraneni, P.; Hajibabaee, A.; Ramanathan, S.; Wang, Y.; Weiss, J., "New Insights from Reactivity Testing of Supplementary Cementitious Materials", Cement and Concrete Composites 2019, 103, 331-338 (hereinafter "Suraneni 2019"), the entire contents of which are incorporated by reference herein for all purposes. As a specific example, the precipitated silicate or aluminosilicate material may have a calcium hydroxide consumption of greater than about 20 g calcium hydroxide/ 100 g aluminosilicate, 40 g calcium hydroxide/100 g aluminosilicate, 60 g calcium hydroxide/100 g aluminosilicate, 80 g calcium hydroxide/100 g aluminosilicate, 100 g calcium hydroxide/100 g aluminosilicate, 120 g calcium hydroxide/100 g aluminosilicate, 140 g calcium hydroxide/ 100 g aluminosilicate, or 160 g calcium hydroxide/100 g aluminosilicate when tested using the thermogravimetric analysis calcium hydroxide consumption pozzolanic reactivity test method described in Suraneni 2019.

In various embodiments, the method 900 may include further steps, such as: the collection of a soluble or colloidal or particulate species from a solution and/or suspension in an electrowinning, electrorefining, and/or electrophoretic-deposition reactor; the production of one or metals or metal alloys in an electrochemical or electrical reactor; producing steel using an electric arc furnace; producing aluminum using a Hall reactor; using an electrochemical reactor to produce magnesium metal; the thermal decomposition of a metal salt; the production of magnesium metal in a metallothermic reactor; the production of a metal carbonate via a carbonation reaction; the separation of a solid from a liquid; and/or a solvent extraction, phase separation, absorption, membrane separation, and/or filtration step.

Various examples of aspects of the various embodiments are described in the following paragraphs.

Example 1. A method comprising: providing a source of electricity; selecting an input material to be processed; using the source of electricity to power an electrochemical reactor that converts a salt solution into at least one acid solution and/or at least one base solution; using the acid solution and/or base solution to process the input material; and producing one or more products.

Example 2. The method of example 1, wherein the source of electricity comprises at least 20% renewable sources, including without limitation solar, wind, hydroelectric, geothermal, or nuclear electricity generation facilities.

Example 3. The method of example 1, wherein the source of electricity comprises at least 40% renewable sources, including without limitation solar, wind, hydroelectric, geothermal, or nuclear electricity generation facilities.

Example 4. The method of example 1, wherein the source of electricity comprises at least 60% renewable sources, including without limitation solar, wind, hydroelectric, geothermal, or nuclear electricity generation facilities.

Example 5. The method of example 1, wherein the source of electricity comprises at least 80% renewable sources, including without limitation solar, wind, hydroelectric, geothermal, or nuclear electricity generation facilities.

Example 6. The method of example 1, wherein the source of electricity comprises at least 90% renewable sources, including without limitation solar, wind, hydroelectric, geothermal, or nuclear electricity generation facilities.

Example 7. The method of any of examples 1 through 6, wherein the input material comprises at least 20% by weight inorganic compounds.

Example 8. The method of any of examples 1 through 6, wherein the input material comprises at least 40% by weight inorganic compounds.

Example 9. The method of any of examples 1 through 6, wherein the input material comprises at least 60% by weight inorganic compounds.

Example 10. The method of any of examples 1 through 6, wherein the input material comprises at least 80% by weight inorganic compounds.

Example 11. The method of any of examples 1 through 6, wherein the input material comprises at least 90% by weight inorganic compounds.

Example 12. The method of any of examples 1 through 6, wherein the input material comprises an industrial waste byproduct material.

Example 13. The method of any of examples 1 through 6, wherein the input material comprises coal ash.

Example 14. The method of any of examples 1 through 6, wherein the input material comprises ponded or landfilled coal ash.

Example 15. The method of any of examples 1 through 6, wherein the input material comprises coal bottom ash.

Example 16. The method of any of examples 1 through 6, wherein the input material comprises municipal waste incinerator ash.

Example 17. The method of any of examples 1 through 6, wherein the input material comprises recycled or waste construction materials such as crushed concrete.

Example 18. The method of any of examples 1 through 6, wherein the input material comprises limestone and/or dolomite.

Example 19. The method of any of examples 1 through 6, wherein the input material comprises mafic and/or ultramafic rock.

Example 20. The method of any of examples 1 through 6, wherein the input material comprises olivine.

Example 21. The method of any of examples 1 through 6, wherein the input material comprises basalt.

Example 22. The method of any of examples 1 through 6, wherein the input material comprises wollastonite.

Example 23. The method of any of examples 1 through 6, wherein the input material comprises lime kiln dust.

Example 24. The method of any of examples 1 through 6, wherein the input material comprises cement kiln dust.

Example 25. The method of any of examples 1 through 24, wherein the input material is a solid.

Example 26. The method of any of examples 1 through 24, wherein the input material comprises greater than about 30% $SiO_2$ as a mass percentage of the input material.

Example 27. The method of any of examples 1 through 24, wherein the input material comprises greater than about 50% $SiO_2$ as a mass percentage of the input material.

Example 28. The method of any of examples 1 through 24, wherein the input material comprises greater than about 70% $SiO_2$ as a mass percentage of the input material.

Example 29. The method of any of examples 1 through 24, wherein the input material comprises greater than about 90% $SiO_2$ as a mass percentage of the input material.

Example 30. The method of any of examples 1 through 29, wherein the input material comprises greater than about 2% CaO as a mass percentage of the input material.

Example 31. The method of any of examples 1 through 29, wherein the input material comprises greater than about 5% CaO as a mass percentage of the input material.

Example 32. The method of any of examples 1 through 29, wherein the input material comprises greater than about 10% CaO as a mass percentage of the input material.

Example 33. The method of any of examples 1 through 29, wherein the input material comprises greater than about 20% CaO as a mass percentage of the input material.

Example 34. The method of any of examples 1 through 29, wherein the input material comprises greater than about 40% CaO as a mass percentage of the input material.

Example 35. The method of any of examples 1 through 3424, wherein the input material comprises greater than about 2% MgO as a mass percentage of the input material.

Example 36. The method of any of examples 1 through 3424, wherein the input material comprises greater than about 5% MgO as a mass percentage of the input material.

Example 37. The method of any of examples 1 through 3424, wherein the input material comprises greater than about 10% MgO as a mass percentage of the input material.

Example 38. The method of any of examples 1 through 3424, wherein the input material comprises greater than about 20% MgO as a mass percentage of the input material.

Example 39. The method of any of examples 1 through 3424, wherein the input material comprises greater than about 40% MgO as a mass percentage of the input material.

Example 40. The method of any of examples 1 through 39, wherein the input material comprises greater than about 2% $Al_2O_3$ as a mass percentage of the input material.

Example 41. The method of any of examples 1 through 39, wherein the input material comprises greater than about 5% $Al_2O_3$ as a mass percentage of the input material.

Example 42. The method of any of examples 1 through 39, wherein the input material comprises greater than about 10% $Al_2O_3$ as a mass percentage of the input material.

Example 43. The method of any of examples 1 through 39, wherein the input material comprises greater than about 20% $Al_2O_3$ as a mass percentage of the input material.

Example 44. The method of any of examples 1 through 39, wherein the input material comprises greater than about 40% $Al_2O_3$ as a mass percentage of the input material.

Example 45. The method of any of examples 1 through 39, wherein the input material comprises greater than about 60% $Al_2O_3$ as a mass percentage of the input material.

Example 46. The method of any of examples 1 through 39, wherein the input material comprises greater than about 80% $Al_2O_3$ as a mass percentage of the input material.

Example 47. The method of any of examples 1 through 47, wherein the input material comprises greater than about 2% $Fe_2O_3$ as a mass percentage of the input material.

Example 48. The method of any of examples 1 through 47, wherein the input material comprises greater than about 5% $Fe_2O_3$ as a mass percentage of the input material.

Example 49. The method of any of examples 1 through 47, wherein the input material comprises greater than about 10% $Fe_2O_3$ as a mass percentage of the input material.

Example 50. The method of any of examples 1 through 47, wherein the input material comprises greater than about 20% $Fe_2O_3$ as a mass percentage of the input material.

Example 51. The method of any of examples 1 through 47, wherein the input material comprises greater than about 40% $Fe_2O_3$ as a mass percentage of the input material.

Example 52. The method of any of examples 1 through 51, wherein the electrochemical reactor comprises an electrolytic reactor.

Example 53. The method of any of examples 1 through 51, wherein the electrochemical reactor comprises an electrodialysis reactor.

Example 54. The method of any of examples 1 through 51, wherein the electrochemical reactor comprises a chlor-alkali electrolyzer.

Example 55. The method of any of examples 1 through 51, wherein the electrochemical reactor comprises a neutral pH electrolyzer.

Example 56. The method of any of examples 1 through 51, wherein the electrochemical reactor comprises a salt splitting electrolyzer.

Example 57. The method of any of examples 1 through 51, wherein the electrochemical reactor comprises a bipolar membrane electrodialysis reactor.

Example 58. The method of any of examples 1 through 51, wherein the electrochemical reactor comprises a two-compartment bipolar membrane electrodialysis reactor.

Example 59. The method of any of examples 1 through 51, wherein the electrochemical reactor comprises a three-compartment bipolar membrane electrodialysis reactor.

Example 60. The method of any of examples 1 through 51, wherein the electrochemical reactor comprises an electrolytic reactor that does not contain an ion exchange membrane.

Example 61. The method of any of examples 1 through 51, wherein the electrochemical reactor comprises an electrolytic reactor that does not contain an ion exchange membrane, diaphragm, porous separator, or any other membrane or porous material between the anode and cathode.

Example 62. The method of any of examples 1 through 61, wherein the electrochemical reactor accepts an input salt solution comprising sodium chloride.

Example 63. The method of any of examples 1 through 61, wherein the electrochemical reactor accepts an input salt solution comprising sodium nitrate.

Example 64. The method of any of examples 1 through 61, wherein the electrochemical reactor accepts an input salt solution comprising sodium perchlorate.

Example 65. The method of any of examples 1 through 61, wherein the electrochemical reactor accepts an input salt solution comprising a mixture containing at least 5% mass of two or more sodium salts.

Example 66. The method of any of examples 1 through 61, wherein the electrochemical reactor accepts an input salt solution comprising potassium chloride, potassium nitrate, or potassium perchlorate.

Example 67. The method of any of examples 1 through 61, wherein the electrochemical reactor accepts an input salt solution comprising ammonium chloride, ammonium nitrate, or ammonium perchlorate.

Example 68. The method of any of examples 1 through 61, wherein the electrochemical reactor produces an acid solution comprising hydrochloric acid.

Example 69. The method of any of examples 1 through 61, wherein the electrochemical reactor produces an acid solution comprising nitric acid.

Example 70. The method of any of examples 1 through 61, wherein the electrochemical reactor produces an acid solution comprising perchloric acid.

Example 71. The method of any of examples 1 through 61, wherein the electrochemical reactor produces an acid solution comprising a mixture containing at least 0.5% mass of two or more acids from the group including hydrochloric acid, nitric acid, and perchloric acid.

Example 72. The method of any of examples 1 through 71, wherein the electrochemical reactor produces a base solution comprising sodium hydroxide.

Example 73. The method of any of examples 1 through 71, wherein the electrochemical reactor produces a base solution comprising potassium hydroxide.

Example 74. The method of any of examples 1 through 71, wherein the electrochemical reactor produces a base solution comprising ammonium hydroxide.

Example 75. The method of any of examples 1 through 71, wherein the electrochemical reactor comprises a chlor-alkali electrolyzer that produces a sodium hydroxide solution, hydrogen gas, and chlorine gas.

Example 76. The method of example 75, wherein the hydrogen gas and chlorine gas produced by the chlor-alkali electrolyzer are reacted to produce hydrochloric acid.

Example 77. The method of example 75, wherein the hydrogen gas and chlorine gas produced by the chlor-alkali electrolyzer are reacted to produce hydrochloric acid in an acid burner.

Example 78. The method of example 75, wherein the hydrogen gas and chlorine gas produced by the chlor-alkali electrolyzer are reacted to produce hydrochloric acid in a hydrogen/chlorine fuel cell.

Example 79. The method of any of examples 1 through 78, wherein the acid and/or base produced by the electrochemical reactor are used to leach and/or dissolve components of the input materials.

Example 80. The method of any of examples 1 through 78, wherein the acid and/or base produced by the electrochemical reactor are used to leach and/or dissolve calcium from an input material.

Example 81. The method of any of examples 1 through 78, wherein the acid and/or base produced by the electrochemical reactor are used to leach and/or dissolve magnesium from an input material.

Example 82. The method of any of examples 1 through 78, wherein the acid and/or base produced by the electrochemical reactor are used to leach and/or dissolve at least one transition metal from an input material.

Example 83. The method of any of examples 1 through 78, wherein the acid and/or base produced by the electrochemical reactor are used to leach and/or dissolve silicon or silica from an input material.

Example 84. The method of any of examples 1 through 78, wherein the acid and/or base produced by the electrochemical reactor are used to leach and/or dissolve aluminum or alumina from an input material.

Example 85. The method of any of examples 1 through 78, wherein the acid and/or base produced by the electrochemical reactor are used to leach and/or dissolve iron from an input material.

Example 86. The method of any of examples 1 through 78, wherein the acid and/or base produced by the electrochemical reactor are used to leach and/or dissolve copper from an input material.

Example 87. The method of any of examples 1 through 78, wherein the acid and/or base produced by the electrochemical reactor are used to leach and/or dissolve zinc from an input material.

Example 88. The method of any of examples 1 through 78, wherein the acid and/or base produced by the electrochemical reactor are used to leach and/or dissolve potassium from an input material.

Example 89. The method of any of examples 1 through 78, wherein the acid and/or base produced by the electrochemical reactor are used to leach and/or dissolve sodium from an input material.

Example 90. The method of any of examples 1 through 78, wherein an acid solution produced by the electrochemical reactor is used to leach and/or dissolve calcium from an input material.

Example 91. The method of any of examples 1 through 78, wherein an acid solution produced by the electrochemical reactor is used to leach and/or dissolve magnesium from an input material.

Example 92. The method of any of examples 1 through 78, wherein an acid solution produced by the electrochemical reactor is used to leach and/or dissolve at least one transition metal from an input material.

Example 93. The method of any of examples 1 through 78, wherein an acid solution produced by the electrochemical reactor is used to leach and/or dissolve silicon or silica from an input material.

Example 94. The method of any of examples 1 through 78, wherein an acid solution produced by the electrochemical reactor is used to leach and/or dissolve aluminum or alumina from an input material.

Example 95. The method of any of examples 1 through 78, wherein an acid solution produced by the electrochemical reactor is used to leach and/or dissolve iron from an input material.

Example 96. The method of any of examples 1 through 78, wherein an acid solution produced by the electrochemical reactor is used to leach and/or dissolve copper from an input material.

Example 97. The method of any of examples 1 through 78, wherein an acid solution produced by the electrochemical reactor is used to leach and/or dissolve zinc from an input material.

Example 98. The method of any of examples 1 through 78, wherein an acid solution produced by the electrochemical reactor is used to leach and/or dissolve potassium from an input material.

Example 99. The method of any of examples 1 through 78, wherein an acid solution produced by the electrochemical reactor is used to leach and/or dissolve potassium from an input material.

Example 100. The method of any of examples 1 through 78, wherein an acid solution produced by the electrochemical reactor is used to leach and/or dissolve sodium from an input material.

Example 101. The method of any of examples 1 through 78, wherein an acid solution produced by the electrochemical reactor is used to leach and/or dissolve calcium, magnesium, and/or transition metals from an input material, leaving behind insoluble solids comprising alumina and/or silica.

Example 102. The method of any of examples 1 through 78, wherein an acid solution produced by the electrochemical reactor is used to leach and/or dissolve calcium, magnesium, and/or transition metals from an input material, while simultaneously comminuting insoluble solids comprising alumina and/or silica.

Example 103. The method of any of examples 1 through 78, wherein an acid solution produced by the electrochemical reactor is used to leach and/or dissolve calcium, magnesium, and/or transition metals from an input material, leaving behind insoluble solids comprising alumina and/or silica with mean major particle diameter smaller than the mean major particle diameter of the input material.

Example 104. The method of any of examples 1 through 103, wherein an acid and/or a base produced by the electrochemical reactor is reacted with a dissolved component of the input material to precipitate a solid material.

Example 105. The method of any of examples 1 through 103, wherein an acid and/or a base produced by the electrochemical reactor is reacted with dissolved calcium ions leached from the input material to precipitate calcium hydroxide.

Example 106. The method of any of examples 1 through 103, wherein an acid and/or a base produced by the electrochemical reactor is reacted with dissolved magnesium ions leached from the input material to precipitate magnesium hydroxide.

Example 107. The method of any of examples 1 through 103, wherein a base produced by the electrochemical reactor is reacted with dissolved calcium ions leached from the input material to precipitate calcium hydroxide.

Example 108. The method of any of examples 1 through 103, wherein a base produced by the electrochemical reactor is reacted with dissolved magnesium ions leached from the input material to precipitate magnesium hydroxide.

Example 109. The method of any of examples 1 through 108, wherein an acid, base, or salt solution is purified to remove solid particles, dissolved species, and/or dissolved ions.

Example 110. The method of any of examples 1 through 108, wherein a salt solution is purified to remove solid particles, dissolved species, and/or dissolved ions.

Example 111. The method of any of examples 1 through 108, wherein a salt solution is purified using an ion exchange process to remove dissolved ions.

Example 112. The method of any of examples 1 through 108, wherein a salt solution is purified using a filtration process to remove solid particles.

Example 113. The method of any of examples 1 through 108, wherein a salt solution is purified using an electrowinning process to remove dissolved metals.

Example 114. The method of any of examples 1 through 113, wherein the steps used to process an input material result in the regeneration of a salt solution, which is recycled to the electrochemical reactor.

Example 115. The method of any of examples 1 through 113, wherein the materials processing method additionally comprises the collection of a soluble or colloidal or particulate species from a solution and/or suspension in an electrowinning, electrorefining, and/or electrophoretic-deposition reactor.

Example 116. The method of any of examples 1 through 113, wherein the materials processing method additionally comprises the production of one or metals or metal alloys in an electrochemical or electrical reactor.

Example 117. The method of example 116, wherein steel is produced using an electric arc furnace.

Example 118. The method of example 116, wherein aluminum is produced using a Hall reactor.

Example 119. The method of example 116, wherein an electrochemical reactor is used to produce magnesium metal.

Example 120. The method of any of examples 1 through 119, wherein the materials processing method additionally comprises the thermal decomposition of a metal salt.

Example 121. The method of any of examples 1 through 119, wherein the materials processing method additionally comprises a process for producing magnesium metal in a metallothermic reactor.

Example 122. The method of any of examples 1 through 119, wherein the materials processing method additionally comprises the production of a metal carbonate via a carbonation reaction.

Example 123. The method of any of examples 1 through 119, wherein the materials processing method additionally comprises the separation of a solid from a liquid.

Example 124. The method of any of examples 1 through 119, wherein the materials processing method additionally comprises a solvent extraction, phase separation, absorption, membrane separation, or filtration step.

Example 125. The method of any of examples 1 through 124, wherein the products produced by the process comprise an acid solution.

Example 126. The method of any of examples 1 through 124, wherein the products produced by the process comprise a hydrochloric acid solution.

Example 127. The method of any of examples 1 through 124, wherein the products produced by the process comprise a nitric acid solution.

Example 128. The method of any of examples 1 through 124, wherein the products produced by the process comprise a perchloric acid solution.

Example 129. The method of any of examples 1 through 124, wherein the products produced by the process comprise a base solution.

Example 130. The method of any of examples 1 through 124, wherein the products produced by the process comprise a sodium hydroxide solution.

Example 131. The method of any of examples 1 through 124, wherein the products produced by the process comprise a potassium hydroxide solution.

Example 132. The method of any of examples 1 through 124, wherein the products produced by the process comprise an ammonium hydroxide solution.

Example 133. The method of any of examples 1 through 124, wherein the products produced by the process comprise a silicate or aluminosilicate material.

Example 134. The method of any of examples 1 through 124, wherein the products produced by the process comprise a silicate or aluminosilicate material with an amorphous fraction greater than about 50%.

Example 135. The method of any of examples 1 through 124, wherein the products produced by the process comprise a silicate or aluminosilicate material with a median particle size less than about 100 micrometers.

Example 136. The method of any of examples 1 through 124, wherein the products produced by the process comprise a silicate or aluminosilicate material with a median particle size less than about 50 micrometers.

Example 137. The method of any of examples 1 through 124, wherein the products produced by the process comprise a silicate or aluminosilicate material with a median particle size less than about 50 micrometers.

Example 138. The method of any of examples 1 through 124, wherein the products produced by the process comprise a pozzolanic material.

Example 139. The method of any of examples 1 through 124, wherein the products produced by the process comprise a supplementary cementitious material.

Example 140. The method of any of examples 1 through 124, wherein the products produced by the process comprise a cementitious binder.

Example 141. The method of any of examples 1 through 124, wherein the products produced by the process comprise a pozzolanic cement.

Example 142. The method of any of examples 1 through 141, wherein the products produced by the process comprise a metal.

Example 143. The method of any of examples 1 through 141, wherein the products produced by the process comprise calcium metal.

Example 144. The method of any of examples 1 through 141, wherein the products produced by the process comprise magnesium metal.

Example 145. The method of any of examples 1 through 141, wherein the products produced by the process comprise iron metal.

Example 146. The method of any of examples 1 through 141, wherein the products produced by the process comprise copper metal.

Example 147. The method of any of examples 1 through 141, wherein the products produced by the process comprise zinc metal.

Example 148. The method of any of examples 1 through 141, wherein the products produced by the process comprise cobalt metal.

Example 149. The method of any of examples 1 through 141, wherein the products produced by the process comprise aluminum metal.

Example 150. The method of any of examples 1 through 141, wherein the products produced by the process comprise chromium metal.

Example 151. The method of any of examples 1 through 141, wherein the products produced by the process comprise copper metal.

Example 152. The method of any of examples 1 through 141, wherein the products produced by the process comprise a metal hydroxide.

Example 153. The method of any of examples 1 through 141, wherein the products produced by the process comprise calcium hydroxide.

Example 154. The method of any of examples 1 through 141, wherein the products produced by the process comprise magnesium hydroxide.

Example 155. The method of any of examples 1 through 141, wherein the products produced by the process comprise sodium hydroxide.

Example 156. The method of any of examples 1 through 141, wherein the products produced by the process comprise potassium hydroxide.

Example 157. The method of any of examples 1 through 141, wherein the products produced by the process comprise ammonium hydroxide.

Example 158. The method of any of examples 1 through 141, wherein the products produced by the process comprise a metal carbonate.

Example 159. The method of any of examples 1 through 141, wherein the products produced by the process comprise calcium carbonate.

Example 160. The method of any of examples 1 through 141, wherein the products produced by the process comprise magnesium carbonate.

Example 161. The method of any of examples 1 through 141, wherein the products produced by the process comprise sodium carbonate.

Example 162. The method of any of examples 1 through 141, wherein the products produced by the process comprise potassium carbonate.

Example 163. The method of any of examples 1 through 141, wherein the products produced by the process comprise ammonium carbonate.

Example 164. The method of any of examples 1 through 141, wherein the products produced by the process comprise sodium bicarbonate.

Example 165. The method of any of examples 1 through 141, wherein the products produced by the process comprise potassium bicarbonate.

Example 166. The method of any of examples 1 through 141, wherein the products produced by the process comprise ammonium bicarbonate.

Example 167. The method of any of examples 1 through 141, wherein the products produced by the process comprise a metal salt.

Example 168. The method of any of examples 1 through 141, wherein the products produced by the process comprise calcium chloride.

Example 169. The method of any of examples 1 through 141, wherein the products produced by the process comprise magnesium chloride.

Example 170. The method of any of examples 1 through 141, wherein the products produced by the process comprise iron chloride.

Example 171. The method of any of examples 1 through 141, wherein the products produced by the process comprise zinc chloride.

Example 172. The method of any of examples 1 through 141, wherein the products produced by the process comprise copper chloride.

Example 173. The method of any of examples 1 through 141, wherein the products produced by the process comprise titanium chloride.

Example 174. The method of any of examples 1 through 141, wherein the products produced by the process comprise calcium nitrate.

Example 175. The method of any of examples 1 through 141, wherein the products produced by the process comprise magnesium nitrate.

Example 176. The method of any of examples 1 through 141, wherein the products produced by the process comprise calcium perchlorate.

Example 177. The method of any of examples 1 through 141, wherein the products produced by the process comprise magnesium perchlorate.

Example 178. The method of any of examples 1 through 177, wherein a carbonate or bicarbonate product is produced using $CO_2$ from a fossil fuel combustion flue gas stream.

Example 179. The method of any of examples 1 through 177, wherein a carbonate or bicarbonate product is produced using $CO_2$ from the decomposition of a magnesium carbonate, calcium carbonate, and/or magnesium-calcium carbonate.

Example 180. The method of any of examples 1 through 177, wherein a carbonate or bicarbonate product is produced using direct air-captured $CO_2$.

Example 181. The method of any of examples 1 through 181, wherein a carbonate or bicarbonate product is produced, a silicate or aluminosilicate is at least partially dissolved, and a silicate or aluminosilicate is precipitated.

Example 182. The method of example 182, wherein the precipitated silicate or aluminosilicate material is a supplementary cementitious material.

Example 183. The method of example 182, wherein the precipitated silicate or aluminosilicate material has optimized reactivity and water demand.

Example 184. The method of example 182, wherein the precipitated silicate or aluminosilicate material has a paste consistency water demand of less than 0.4.

Example 185. The method of example 182, wherein the precipitated silicate or aluminosilicate material has a paste consistency water demand of less than 0.5.

Example 186. The method of example 182, wherein the precipitated silicate or aluminosilicate material has a paste consistency water demand of less than 0.6.

Example 187. The method of example 182, wherein the precipitated silicate or aluminosilicate material has a mini-slump cone water demand of less than 0.4.

Example 188. The method of example 182, wherein the precipitated silicate or aluminosilicate material has a mini-slump cone water demand of less than 0.5.

Example 189. The method of example 182, wherein the precipitated silicate or aluminosilicate material has a mini-slump cone water demand of less than 0.6.

Example 190. The method of any of examples 182 through 190, wherein the precipitated silicate or aluminosilicate material has a heat release of greater than about 200 J/g aluminosilicate.

Example 191. The method of example 190, wherein the precipitated silicate or aluminosilicate material has a heat release of greater than about 300 J/g aluminosilicate.

Example 192. The method of example 190, wherein the precipitated silicate or aluminosilicate material has a heat release of greater than about 400 J/g aluminosilicate.

Example 193. The method of example 190, wherein the precipitated silicate or aluminosilicate material has a heat release of greater than about 500 J/g aluminosilicate.

Example 194. The method of example 190, wherein the precipitated silicate or aluminosilicate material has a heat release of greater than about 600 J/g aluminosilicate.

Example 195. The method of example 190, wherein the precipitated silicate or aluminosilicate material has a heat release of greater than about 700 J/g aluminosilicate.

Example 196. The method of any of examples 182 through 190, wherein the precipitated silicate or aluminosilicate material has a calcium hydroxide consumption of greater than about 20 g calcium hydroxide/100 g aluminosilicate.

Example 197. The method of example 196, wherein the precipitated silicate or aluminosilicate material has a calcium hydroxide consumption of greater than about 40 g calcium hydroxide/100 g aluminosilicate.

Example 198. The method of example 196, wherein the precipitated silicate or aluminosilicate material has a calcium hydroxide consumption of greater than about 60 g calcium hydroxide/100 g aluminosilicate.

Example 199. The method of example 196, wherein the precipitated silicate or aluminosilicate material has a calcium hydroxide consumption of greater than about 80 g calcium hydroxide/100 g aluminosilicate.

Example 200. The method of example 196, wherein the precipitated silicate or aluminosilicate material has a calcium hydroxide consumption of greater than about 100 g calcium hydroxide/100 g aluminosilicate.

Example 201. The method of example 196, wherein the precipitated silicate or aluminosilicate material has a calcium hydroxide consumption of greater than about 120 g calcium hydroxide/100 g aluminosilicate.

Example 202. The method of example 196, wherein the precipitated silicate or aluminosilicate material has a calcium hydroxide consumption of greater than about 140 g calcium hydroxide/100 g aluminosilicate.

Example 203. The method of example 196, wherein the precipitated silicate or aluminosilicate material has a calcium hydroxide consumption of greater than about 160 g calcium hydroxide/100 g aluminosilicate.

Example 204. A system configured to perform the operations of any of the methods of any of examples 1-203.

Example 205. A system, comprising: a source of electricity; an electrochemical reactor powered by the source of electricity that converts a salt solution into at least one acid solution and/or at least one base solution; chemical, mechanical, electrical, and/or electrochemical process equipment for handling and/or introducing one or more input materials into the system; chemical, mechanical, electrical, and/or electrochemical process equipment used to react the input material(s) with at least one of solutions produced by the electrochemical reactor; chemical, mechanical, electrical, and/or electrochemical process equipment for collecting and/or outputting one or more products from the system.

Example 206. The system of example 205, wherein the system is configured to perform operations of any of the methods of any of examples 1-203.

Example 207. A method comprising: selecting an input material to be processed; processing the input material; and producing one or more products.

Example 208. The method of example 207, wherein processing the input material comprises using at least one acid solution and/or at least one base solution to process the input material.

Example 209. The method of example 208, wherein the acid solution and/or the base solution are electrochemically produced.

Example 210. The method of example 208, wherein the acid solution and/or the base solution are not electrochemically produced.

Example 211. The method of any of examples 207-210, wherein the input material is as described in examples 7-51, wherein the further steps and/or aspects described in any of examples 109-113 are further performed and/or applied in relation to the methods of any of examples 207-210, and/or wherein the further steps and/or aspects described in any of examples 116-203 are further performed and/or applied in relation to the methods of any of examples 207-210.

Example 212. A system configured to perform the operations of any of the methods of any of examples 207-211.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular. Further, any step of any embodiment described herein can be used in any other embodiment.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A method for making a lime and a supplementary cementitious material, wherein the lime comprises calcium hydroxide, and wherein the supplementary cementitious material comprises $SiO_2$, the method comprising:

providing a source of electricity;

selecting an input material to be processed, wherein the input material is a solid comprising at least 40% $SiO_2$ by mass and at least 5% CaO by mass;

using the source of electricity to power an electrochemical reactor that converts an aqueous salt solution into at least one acid solution and at least one base solution;

using the acid solution to dissolve CaO from the input material, forming a suspension of insoluble solid particles comprising $SiO_2$ in an aqueous solution comprising dissolved calcium ions;

separating the insoluble solid particles from the aqueous solution using settling and/or filtration;

using the base solution and the aqueous solution comprising dissolved calcium ions to perform a precipitation reaction, forming a suspension of solid particles comprising calcium hydroxide in an aqueous base-treated solution;

separating the solid particles comprising calcium hydroxide from the aqueous base-treated solution using settling and/or filtration; and grinding the separated insoluble solid particles to a median major diameter less than about 10 microns and a specific surface area of greater than 10 $m^2/g$ such that the ground insoluble solid particles comprising $SiO_2$ have a calcium hydroxide consumption of greater than 60 g calcium hydroxide per 100 g silicate using a thermogravimetric analysis calcium hydroxide consumption pozzolanic reactivity tests.

2. The method of claim 1, wherein the method further comprises forming a pozzolanic cement from the ground insoluble solid particles comprising $SiO_2$ and the solid particles comprising calcium hydroxide.

3. The method of claim 2, wherein the method further comprises forming the pozzolanic cement from the ground insoluble solid particles comprising $SiO_2$, the solid particles comprising calcium hydroxide, and at least one of gypsum and sodium hydroxide.

4. The method of claim 1, wherein the ground insoluble solid particles comprising $SiO_2$ have a calcium hydroxide consumption of greater than 80 g calcium hydroxide per 100 g silicate using a thermogravimetric analysis calcium hydroxide consumption pozzolanic reactivity test.

5. The method of claim 1, wherein the ground insoluble solid particles comprising $SiO_2$ have a calcium hydroxide consumption of greater than 100 g calcium hydroxide per 100 g silicate using a thermogravimetric analysis calcium hydroxide consumption pozzolanic reactivity test.

6. The method of claim 1, wherein the insoluble solid particles comprise an aluminosilicate.

7. The method of claim 1, wherein the input material further comprises at least 2% MgO by mass, at least 3% $Al_2O_3$ by mass, and at least 3% $Fe_2O_3$ by mass, and the method further comprises:

using the acid solution to dissolve MgO, $Al_2O_3$, and $Fe_2O_3$ from the input material, forming an aqueous solution comprising dissolved magnesium ions, aluminum ions, and iron ions.

8. The method of claim 7, wherein the method further comprises:

using the base solution and the aqueous solution comprising dissolved magnesium ions to perform a precipitation reaction, forming a suspension of solid particles comprising magnesium hydroxide in an aqueous base-treated solution; and separating the solid particles comprising magnesium hydroxide from the aqueous base-treated solution using settling and/or filtration.

9. The method of claim 8, wherein the method further comprises:

performing a precipitation reaction to form a suspension of solid particles comprising additional metal hydroxide in an aqueous base-treated solution; and separating the solid particles comprising the additional metal hydroxide from the aqueous base-treated solution using settling and/or filtration.

10. The method of claim 8, wherein the method further comprises using a brine treatment subsystem to treat the aqueous base-treated solution, then recycling the brine-treated solution to the electrochemical reactor.

11. The method of claim 10, wherein the electrochemical reactor comprises a chlor-alkali electrolyzer.

12. The method of claim 10, wherein the electrochemical reactor comprises a neutral pH electrolyzer.

13. The method of claim 10, wherein the method further comprises sequestering carbon dioxide by producing a metal carbonate or bicarbonate through a reaction with carbon dioxide.

14. The method of claim 10, wherein the method comprises using the acid solution to dissolve calcium from the input material while simultaneously comminuting insoluble solids comprising silica.

15. The method of claim 10, wherein the input material comprises mafic and/or ultramafic rock.

16. The method of claim 15, wherein the input material comprises basalt.

17. The method of claim 10, wherein the input material comprises an industrial waste byproduct material.

18. The method of claim 17, wherein the input material comprises at least one transition metal, and the method further comprises dissolving a transition metal from the input material using the acid solution and electrodepositing via electrowinning the dissolved transition metal from the acid solution as a metallic transition metal product.

19. The method of claim 10, wherein the input material comprises at least one transition metal, and the method further comprises dissolving a transition metal from the input material using the acid solution and electrodepositing via electrowinning the dissolved transition metal from the acid solution as a metallic transition metal product.

\* \* \* \* \*